(12) United States Patent
Brown et al.

(10) Patent No.: US 12,502,609 B2
(45) Date of Patent: Dec. 23, 2025

(54) AUGMENTED REALITY RIDING COURSE GENERATION

(71) Applicant: Snap Inc., Santa Monica, CA (US)

(72) Inventors: Edmund Graves Brown, Los Angeles, CA (US); Benjamin Lucas, San Francisco, CA (US); Jonathan M. Rodriguez, II, La Habra, CA (US); Richard Zhuang, San Diego, CA (US)

(73) Assignee: Snap Inc., Santa Monica, CA (US)

( * ) Notice: Subject to any disclaimer, the term of this patent is extended or adjusted under 35 U.S.C. 154(b) by 0 days.

(21) Appl. No.: 18/467,425

(22) Filed: Sep. 14, 2023

(65) Prior Publication Data

US 2023/0415044 A1 Dec. 28, 2023

Related U.S. Application Data

(63) Continuation of application No. 17/453,123, filed on Nov. 1, 2021, now Pat. No. 11,813,528.

(51) Int. Cl.
*A63F 13/65* (2014.01)
*A63F 13/213* (2014.01)
(Continued)

(52) U.S. Cl.
CPC ............ *A63F 13/65* (2014.09); *A63F 13/213* (2014.09); *A63F 13/537* (2014.09); *A63F 13/5378* (2014.09); *B60K 35/10* (2024.01); *B60K 35/213* (2024.01); *B60K 35/22* (2024.01); *B60K 35/60* (2024.01); *A63F 2300/8082* (2013.01)

(58) Field of Classification Search
None
See application file for complete search history.

(56) References Cited

U.S. PATENT DOCUMENTS

| 5,659,691 A | 8/1997 | Durward et al. |
| 6,200,138 B1 | 3/2001 | Ando et al. |

(Continued)

FOREIGN PATENT DOCUMENTS

| DE | 102019210383 A1 | 1/2021 |
| FR | 3079389 A1 | 10/2019 |
| WO | WO-2023076506 A1 | 5/2023 |

OTHER PUBLICATIONS

Sodikart (WO 2019/185867 A1) (English translation from IP.com) (Year: 2019).*

(Continued)

*Primary Examiner* — Seng H Lim
(74) *Attorney, Agent, or Firm* — Schwegman Lundberg & Woessner, P.A.

(57) ABSTRACT

AR-enhanced gameplay includes a map of a course including a plurality of virtual objects, the map corresponding to a location in the real world and defining a track along which participants can ride on personal mobility systems such as scooters. Virtual objects are displayed in the fields of view of participants' augmented reality devices in a positions corresponding to positions in the real world on the course. Proximity of a participant or their personal mobility system with the position of a virtual object in the real world is detected, and in response to the detection of proximity, a performance characteristic of the participant's personal mobility system is modified.

20 Claims, 13 Drawing Sheets

(51) Int. Cl.
  *A63F 13/537* (2014.01)
  *A63F 13/5378* (2014.01)
  *B60K 35/10* (2024.01)
  *B60K 35/21* (2024.01)
  *B60K 35/22* (2024.01)
  *B60K 35/60* (2024.01)

(56) References Cited

U.S. PATENT DOCUMENTS

| | | | |
|---|---|---|---|
| 9,330,478 B2* | 5/2016 | Anderson | G06T 19/006 |
| 9,566,517 B2 | 2/2017 | Hardy et al. | |
| 10,391,361 B2 | 8/2019 | Watterson | |
| 10,872,584 B2 | 12/2020 | Jones et al. | |
| 10,957,105 B2 | 3/2021 | Carr et al. | |
| 11,045,736 B2 | 6/2021 | Hayashi et al. | |
| 11,085,787 B2* | 8/2021 | Yu | G01C 21/3647 |
| 11,103,784 B2 | 8/2021 | Yabuki et al. | |
| 11,278,810 B1 | 3/2022 | Sarria, Jr. et al. | |
| 11,294,467 B2 | 4/2022 | Forest et al. | |
| 11,484,783 B2 | 11/2022 | Hayashi et al. | |
| 11,504,622 B1* | 11/2022 | Sanchez | A63F 13/795 |
| 11,697,069 B1* | 7/2023 | Sanchez | A63F 13/65 463/31 |
| 2006/0223637 A1 | 10/2006 | Rosenberg | |
| 2009/0005140 A1* | 1/2009 | Rose | A63F 13/56 463/40 |
| 2010/0222179 A1 | 9/2010 | Temple et al. | |
| 2014/0002444 A1 | 1/2014 | Bennett et al. | |
| 2014/0285523 A1* | 9/2014 | Gruenler | B60R 1/31 345/633 |
| 2014/0304335 A1 | 10/2014 | Fung et al. | |
| 2015/0323993 A1 | 11/2015 | Levesque et al. | |
| 2015/0325052 A1 | 11/2015 | Kuehne | |
| 2015/0356774 A1 | 12/2015 | Gal et al. | |
| 2016/0250519 A1 | 9/2016 | Watterson | |
| 2017/0060286 A1 | 3/2017 | Gasselin De Richebourg et al. | |
| 2017/0287217 A1 | 10/2017 | Kim et al. | |
| 2018/0189568 A1 | 7/2018 | Powderly et al. | |
| 2018/0369702 A1 | 12/2018 | Hake | |
| 2019/0049968 A1 | 2/2019 | Dean et al. | |
| 2019/0105572 A1 | 4/2019 | Bell et al. | |
| 2019/0337532 A1* | 11/2019 | Myers | G08G 1/0962 |
| 2019/0377345 A1 | 12/2019 | Bachrach et al. | |
| 2020/0056892 A1 | 2/2020 | Haque et al. | |
| 2020/0184233 A1* | 6/2020 | Berberian | G06V 20/588 |
| 2020/0257900 A1* | 8/2020 | Dubroy | G06T 5/50 |
| 2020/0357300 A1 | 11/2020 | Galasso et al. | |
| 2021/0012113 A1 | 1/2021 | Petill et al. | |
| 2021/0072817 A1 | 3/2021 | Bond et al. | |
| 2021/0121781 A1* | 4/2021 | Benedetto | A63F 13/67 |
| 2021/0178265 A1* | 6/2021 | Wada | G06V 20/20 |
| 2021/0215499 A1* | 7/2021 | Kassner | G01C 21/3415 |
| 2021/0256767 A1* | 8/2021 | Velasquez | G06T 19/00 |
| 2022/0005358 A1 | 1/2022 | Haghighat Kashani et al. | |
| 2022/0083790 A1* | 3/2022 | Samona | G06V 20/13 |
| 2022/0241688 A1 | 8/2022 | Brucculeri | |
| 2022/0314120 A1 | 10/2022 | Sarria, Jr. et al. | |
| 2023/0057816 A1* | 2/2023 | Sanchez | A63F 13/803 |
| 2023/0098451 A1 | 3/2023 | Brown et al. | |
| 2023/0139739 A1 | 5/2023 | Brown et al. | |

OTHER PUBLICATIONS

"International Application Serial No. PCT/US2022/048075, International Search Report mailed Feb. 10, 2023", 4 pgs.

"International Application Serial No. PCT/US2022/048075, Written Opinion mailed Feb. 10, 2023", 8 pgs.

"Mario Kart History: How Nintendo Transformed Racing", [Online] Retrieved from the Internet: <https://www.teechu.com/how-super-mario-kart-history>, (Oct. 6, 2018), 12 pgs.

"Mario Kart Wii Wiki Guide: Power Ups", IGN-GameGuides, [Online] Retrieved from the Internet: <https://www.ign.com/wikis/mario-kart-wii/Power_Ups>, (Aug. 23, 2020), 6 pgs.

Charnas, Ian, "Real Life Mario Kart using Microsoft HoloLens Augmented Reality", [Online] Retrieved from the Internet: <https://www.youtube.com/watch?v=X5yNTfBnubl>, (2019), 11 pgs.

Goodwill, Joe, "How and Why to Use Strava for Cycling", [Online] Retrieved from the Internet: <https://averagejoecyclist.com/why-cyclists-should-use-strava/>, (May 3, 2016).

* cited by examiner

US 12,502,609 B2

AUGMENTED REALITY RIDING COURSE GENERATION

RELATED APPLICATION DATA

This application is a continuation of U.S. patent application Ser. No. 17/453,123 filed on Nov. 1, 2021, the contents of which are incorporated herein by reference as if explicitly set forth.

TECHNICAL FIELD

The present disclosure relates generally to personal mobility systems (a "PM system") and wearable devices with displays for augmented or virtual reality (an "AR wearable device"). More particularly, to interactions between a personal mobility device and a head-worn augmented reality device.

BACKGROUND

An increasing focus on the development of alternative modes of transportation, in addition to ride sharing platforms has led to an explosion in the diversity and availability of personal mobility systems. A PM system encompasses all modes of powered personal transportation capable of transporting a user (and sometimes a passenger) from one place to another. Including, but not limited to, powered scooters, bicycles, skateboards, unicycles, kayaks, paddleboards, and surfboards. Electrically-powered bicycles and scooters are sometimes referred to as e-bikes and e-scooters respectively. Powered personal transportation may also include cars, trucks, motorcycles, and boats. In addition to the physical dexterity and agility required to operate them, e-scooters, e-bikes, and self-balancing electric scooters (e.g., Segway® Ninebot) present operational challenges and safety risks that require a higher level of user concentration and ability in order to operate safely. The meteoric rise in the density of PM systems in urban environments coupled with a general lack of user training and a highly cluttered and dynamic operating environment has led to a sharp rise in accidents and hospitalizations.

Traditionally, PM systems are designed with few controls, almost no performance feedback indicators or extremely limited in such capabilities (e.g., LED or LCD battery or speed indicators), and no obstacle detection or avoidance systems. Because of the bare-bones nature of PM systems it may not be feasible or safe to incorporate additional controls or performance indicators.

AR wearable devices, on the other hand, may be implemented with transparent or semi-transparent displays through which the user can view the surrounding environment. Such devices enable a user to see through the transparent or semi-transparent display to view the surrounding physical environment, and to also see objects (e.g., virtual objects such as 3D renderings, images, video, text, and so forth) that are generated for display to appear as a part of, and/or overlaid upon, the physical environment. This is typically referred to as "augmented reality."

AR wearable devices may completely occlude a user's visual field and display a virtual environment through which a user may move or be moved. This is typically referred to as "virtual reality." As used herein, the term "augmented reality" or "AR" refers to both augmented reality and virtual reality as traditionally understood, unless the context indicates otherwise.

BRIEF DESCRIPTION OF THE SEVERAL VIEWS OF THE DRAWINGS

In the drawings, which are not necessarily drawn to scale, like numerals may describe similar components in different views. To easily identify the discussion of any particular element or act, the most significant digit or digits in the reference number refer to the figure number in which that element is first introduced. Some nonlimiting examples are illustrated in the figures of the accompanying drawings in which.

DETAILED DESCRIPTION

Figure 1:
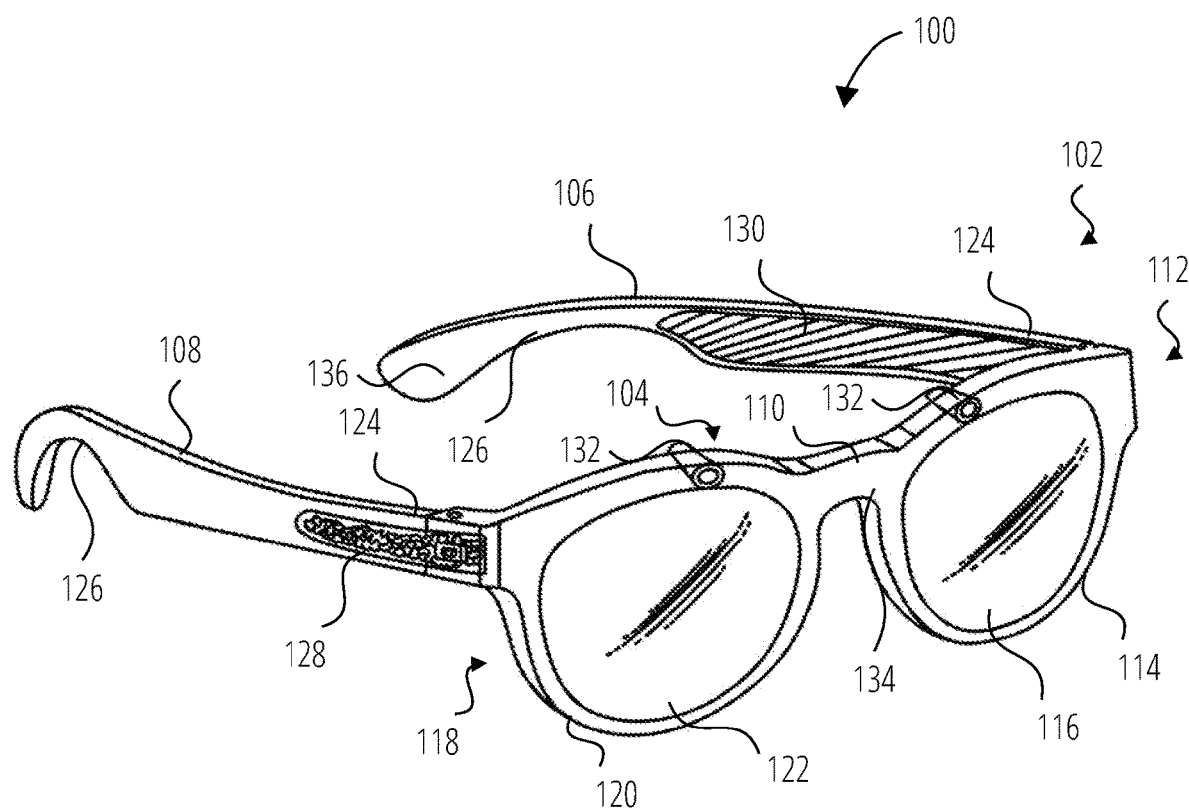
FIG. 1 is a perspective view of a wearable device, in accordance with some examples.

The description that follows describes systems, methods, techniques, instruction sequences, and computing machine program products that illustrate examples of the present subject matter. In the following description, for purposes of explanation, numerous specific details are set forth in order to provide an understanding of various examples of the present subject matter. It will be evident, however, to those skilled in the art, that examples of the present subject matter may be practiced without some or other of these specific details. Examples merely typify possible variations. Unless explicitly stated otherwise, structures (e.g., structural components, such as modules) are optional and may be combined or subdivided, and operations (e.g., in a procedure, algorithm, or other function) may vary in sequence or be combined or subdivided.

Integration of AR wearable devices with PM systems can improve the user experience and mitigate safety risks by lessening the cognitive burden placed on the user. AR wearable devices can not only centralize and display telemetry data and navigation information into the user's field of view but can detect physical obstacles or interact with virtual objects to modulate the performance of the PM system. The AR wearable device can detect and highlight obstacles, traffic control devices, and hazards to warn the user to their presence. The AR wearable device can also use sensors contained within the PM system to further inform or modify the information being perceived by the user and the performance characteristics of the PM system.

In some examples, participants can ride on a course in the real world that has a number of virtual objects located in it, and that can affect the performance of a particular participant's PM system when that participant's PM system intersects with or comes within a certain distance of the virtual object's location in the real world. The virtual objects are displayed to participants on their AR wearable devices as if they were present at their specified locations. Intersection with or proximity to a virtual object can boost the performance of the corresponding PM system (in the case of a "power up"), can reduce the performance of the corresponding PM system (in the case of a "power down") or can provide other effects or consequences. Participants can thus compete against each other, gaining real-world advantages or being disadvantaged based on interaction with virtual objects at locations in the real world.

PM systems, such as powered scooters and e-bikes, typically include a power source (such as a battery), a propulsion source (such as a motor or engine), user controls, an independent braking system, and a management system. Some PM systems may also include radio communications systems (such as cellular, WiFi®, and Bluetooth® transponders) and location systems (e.g., GPS). PM systems described herein may further include sensing technologies such as cameras, sonar sensors, radar sensors, laser sensors, lidar sensors, hear rate sensors, and inertial measurement units ("IMUs," such as accelerometers, gyroscopes, and magnetometers).

Some PM systems include a braking system that may be connected to the management system and is intended to safely stop the PM system during emergencies, in addition to braking during normal operation. The braking system may also be part of a regenerative braking system involving the propulsion source, the management system, and the power source.

Typical operation of a PM system involves transmitting inputs effected by the user on the user controls to the management system; the management system will then control the delivery of power from the power source to the propulsion source to achieve the desired action by the user.

On the other hand, AR wearable devices, such as AR spectacles or AR glasses, include a transparent or semi-transparent display that enables a user to see through the transparent or semi-transparent display to view the surrounding environment. Additional information or objects (e.g., virtual objects such as 3D renderings, images, video, text, and so forth) are shown on the display and appear as a part of, and/or overlaid upon, the surrounding environment to provide an augmented reality experience for the user. The display may for example include a waveguide that receives a light beam from a projector but any appropriate display for presenting augmented or virtual content to the wearer may be used. Like PM systems, AR wearable devices may also include radio communications systems (such as cellular, WiFi®, and Bluetooth® transponders) and location systems (e.g., GPS), camera, and IMU sensors.

As referred to herein, the phrases "augmented reality experience" includes or refers to various image processing operations corresponding to an image modification, filter, media overlay, transformation, and the like, as described further herein. In some examples, these image processing operations provide an interactive experience of a real-world environment, where objects, surfaces, backgrounds, lighting etc. in the real world are enhanced by computer-generated perceptual information. In this context an "augmented reality effect" comprises the collection of data, parameters, and other assets needed to apply a selected augmented reality experience to an image or a video feed. In some examples, augmented reality effects are provided by Snap, Inc. under the registered trademark LENSES.

The rendering of the virtual objects by the AR wearable head-worn device systems may be based on a position of the AR wearable device relative to a physical object or relative to a fixed frame of reference (external to the AR wearable device) so that the virtual object correctly appears in the display. As an example, the AR wearable device may render a virtual object associated with a physical object such that the virtual object may be perceived by the user as appearing to be aligned with the physical object. In another example, graphics (e.g., graphical elements containing information, instructions, and guides) appear to be attached to or overlaying a physical object of interest. To achieve this, the AR wearable device detects the physical object and tracks a pose of the AR wearable device relative to a position of the physical object. A pose identifies a position and orientation of the AR wearable device relative to a frame of reference or relative to another object.

User interaction with the AR wearable device may in some cases be provided by voice commands, by input to an associated device such as a smartphone, by gestures detected by the AR wearable device's cameras, or by a touchpad provided on the AR wearable device, which may be used to provide x-y touch and tap input to the AR wearable device.

In a PM system and AR wearable device integration, the PM system and the AR wearable device are in communication with each other. Each, individually, or through each other, the PM system and the AR wearable device may also be in communication with other devices (such as mobile phones) or with networks containing other devices (such as servers). The PM system may provide the AR wearable device with telemetry information such as speed, acceleration, position of the controls, user position and pose, and battery level. The PM system may also provide information from a camera and other sensors. The AR wearable device, in turn, may provide performance related commands (e.g., limiting or modulating top speed, acceleration, braking power) or non-performance related commands (e.g., turning lights on and off, honking). The AR wearable device may also provide the PM system with telemetry gathered solely by the AR wearable device (e.g., speed calculated by the GPS, position and pose of the user). Similarly, the commands provided by the AR wearable device may be informed by the telemetry and sensor data received from the PM system. Still further, commands provided by the AR wearable device may only informed by information gathered by the AR wearable device.

In some examples, an augmented reality effect includes augmented reality content configured to modify or transform image data presented within a graphic user interface ("GUI") of the AR wearable device in some way. For example, complex additions or transformations to the appearance of the environment in the AR wearable device's field of view may be performed using AR effect data, such as highlighting, animating, or transforming traffic control signals, roads, buildings, and vehicles; adding enhancements to landmarks in a scene being viewed on an AR wearable device; or many numerous other such transformations. This includes both real-time modifications that modify an image as it is captured using a camera associated with the AR wearable device or some other device (e.g., a PM system) in communication with the AR wearable device, which is then displayed by the AR wearable device with the AR effect modifications, as well as modifications to stored content, such as video clips in a gallery that may be modified using AR effects. Similarly, real-time video capture may be used with an AR effect to show to a user of an AR wearable device how video images currently being captured by sensors of a device would modify the captured data. Such data may simply be displayed on the screen and not stored in memory, the content captured by the device sensors may be recorded and stored in memory with or without the AR effect modifications (or both), or the content captured by the device sensors may be transmitted, with the AR effect modification, over the network to a server or another device.

AR effects and associated systems and modules for modifying content using AR effects may thus involve detection of objects (e.g., faces, hands, bodies, cats, dogs, surfaces, objects, etc.), tracking of such objects as they leave, enter, and move around the field of view in video frames, and the modification or transformation of such objects as they are tracked. In various examples, different methods for achieving such transformations may be used. Some examples involve generating a 3D mesh model of the object or objects and using transformations and animated textures of the model within the video to achieve the transformation. In other examples, tracking of points on an object is used to place an image or texture, which may be two dimensional or three dimensional, at the tracked position. In still further examples, neural network analysis of video frames is used to place images, models, or textures in content (e.g., images or frames of video). AR effect data thus may include both the images, models, and textures used to create transformations in content, as well as additional modeling and analysis information needed to achieve such transformations with object detection, tracking, and placement.

In some examples, provided is a method of providing interactive personal mobility systems, performed by one or more processors. The method includes receiving a map of a course including a plurality of virtual objects, the map corresponding to a location in the real world and defining a track along which first and second participants can ride on respective first and second personal mobility systems, displaying a first virtual object on a first augmented reality wearable device corresponding to the first participant, the first virtual object being located in a position in a field of view of the first augmented reality device corresponding to a position in the real world on the course, displaying the first virtual object on a second augmented reality wearable device corresponding to the second participant, the first virtual object being located in a position in a field of view of the second augmented reality device corresponding to the position in the real world on the course, detecting proximity of the first personal mobility system or of the first participant with the position of the first virtual object in the real world, and in response to the detection of proximity, modifying a performance characteristic of the first personal mobility system.

The modification of the performance characteristic may include an alteration of a maximum speed or maximum power of the first personal mobility system, or a score value for the first participant may be incremented or decremented. In response to the detection of proximity, the virtual object may be removed from the map of the course for the second participant.

The method may also further include determining the position of the first and second participants on the course, and displaying first and second status information on the first and second augmented reality wearable devices respectively, based on the positions of the first and second participants on the course. The first and second status information may include elapsed times and leaderboard information.

The position in the real world may be in a location in a frame of reference in an environment in which the personal mobility system is located.

The method may also further include, in response to the detection of proximity, transferring the first virtual object from the location in the frame of reference in the environment to a location in a frame of reference fixed to at least part of the first personal mobility system, and delaying modifying the performance characteristic of the first personal mobility system until an intersection of the first participant with the location in the frame of reference fixed to at least part of the first personal mobility system is detected.

Also provided is a computing apparatus for enabling interactive personal mobility systems comprising a processor; and a memory storing instructions that, when executed by the processor, configure the apparatus to perform the methods described above.

Also provided is a non-transitory computer-readable storage medium, the computer-readable storage medium including instructions that when executed by a computer, cause the computer to perform the methods described above:

Other technical features may be readily apparent to one skilled in the art from the following figures, descriptions, and claims.

FIG. 1 is perspective view of an AR wearable device (e.g., glasses 100), in accordance with some examples. The glasses 100 can include a frame 102 made from any suitable material such as plastic or metal, including any suitable shape memory alloy. In one or more examples, the frame 102 includes a front piece 104 including a first or left optical element holder 114 (e.g., a display or lens holder) and a second or right optical element holder 120 connected by a bridge 110. The front piece 104 additionally includes a left end portion 112 and a right end portion 118. A first or left optical element 116 and a second or right optical element 122 can be provided within respective left optical element holder 114 and right optical element holder 120. Each of the left optical element 116 and the right optical element 122 can be a lens, a display, a display assembly, or a combination of the foregoing. Any of the display assemblies disclosed herein can be provided in the glasses 100.

The frame 102 additionally includes a left temple piece 106 (i.e., a left arm) and a right temple piece 108 (i.e., a right arm) coupled to the respective left end portion 112 and right end portion 118 of the front piece 104 by any suitable means such as a hinge (not shown), so as to be coupled to the front piece 104, or rigidly or fixably secured to the front piece 104 so as to be integral with the front piece 104. In one or more implementations, each of the left temple piece 106 and the right temple piece 108 includes a first arm portion 124 that is coupled to the respective left end portion 112 and right end portion 118 of the front piece 104 and any suitable second arm portion 126 for coupling to the ear of the user. In one example, the front piece 104 can be formed from a single piece of material, so as to have a unitary or integral construction. In one example, such as illustrated in FIG. 1, the entire frame 102 can be formed from a single piece of material so as to have a unitary or integral construction.

The glasses 100 can include a computing device, such as a computer 128, which can be of any suitable type so as to be carried by the frame 102 and, in one or more examples, of a suitable size and shape, so as to be at least partially disposed in one of the left temple piece 106 and the right temple piece 108. In one or more examples, as illustrated in FIG. 1, the computer 128 is sized and shaped similar to the size and shape of the right temple piece 108 (or the left temple piece 106) and is thus disposed almost entirely if not entirely within the structure and confines of such right temple piece 108. In one or more examples, the computer 128 is disposed in both of the right temple piece 108 and the left temple piece 106. The computer 128 can include one or more processors with memory, wireless communication circuitry, sensors and associated circuitry, and a power source. As discussed below, the computer 128 comprises low-power circuitry, high-speed circuitry, and a display processor. Various other examples may include these elements in different configurations or integrated together in different ways. Additional details of aspects of computer 128 may be implemented as illustrated by the glasses 100 discussed below.

The computer 128 additionally includes a battery 130 or other suitable portable power supply. In one example, the battery 130 is disposed in one of the left temple pieces 106 and the right temple piece 108 or multiple batteries 130 located in each temple piece. In the glasses 100 shown in FIG. 1, the battery 130 is shown as being disposed in left temple piece 106 and electrically coupled to the computer 128 through electrical conductors disposed within the front piece 104. The glasses 100 can include a connector or port (not shown) suitable for charging the battery 130 accessible from the outside of frame 102. The glasses 100 can further include a wireless receiver, transmitter, or transceiver (not shown) or a combination of such devices, inertial measurement sensors, and other sensors disposed within the front piece 104, the left temple piece 106, and right temple piece 108.

In one or more implementations, the glasses 100 include one or more cameras 132. Although two cameras are depicted, other examples contemplate the use of a single or additional (i.e., more than two) cameras 132. In one or more examples, the glasses 100 include any number of sensors or peripheral devices in addition to the camera 132. For example, the glasses 100 may include sonar sensors, radar sensors, laser sensors, lidar sensors, and inertial measurement units (such as accelerometers, gyroscopes, and magnetometers).

The front piece 104 is provided with an outward facing, forward-facing front or outer surface 134 that faces forward or away from the user when the glasses 100 are mounted on the face of the user, and an opposite inward-facing, rearward-facing or rear or inner surface 136 that faces the face of the user when the glasses 100 are mounted on the face of the user. Such sensors can include inwardly facing video sensors or digital imaging modules such as a that can be mounted on or provided within the inner surface 136 of the front piece 104 or elsewhere on the frame 102 so as to be facing the user, and outward-facing video sensors or digital imaging modules such as the camera 132 that can be mounted on or provided with the outer surface 134 of the front piece 104 or elsewhere on the frame 102 so as to be facing away from the user. Such sensors, peripheral devices or peripherals can additionally include biometric sensors, location sensors (e.g., GPS), or any other such sensors.

In one or more implementations, the glasses 100 include input sensors such as touchpads or buttons (not shown). The touchpads may be mounted to or integrated with one or both of the left temple piece 106 and right temple piece 108. The touchpads are generally vertically arranged, approximately parallel to a user's temple in one example. As used herein, generally vertically aligned means that the touchpad is at least more vertical than horizontal, although preferably more vertical than that. Additional user input may be provided by one or more buttons. The one or more touchpads and buttons provide a means whereby the glasses 100 can receive input from a user of the glasses 100. The glasses 100 may include microphones to receive verbal commands from the user and monitor other sounds. Similarly, the glasses 100 may include speakers to provide auditory feedback to the user or allow the user to play music.

Figure 2:
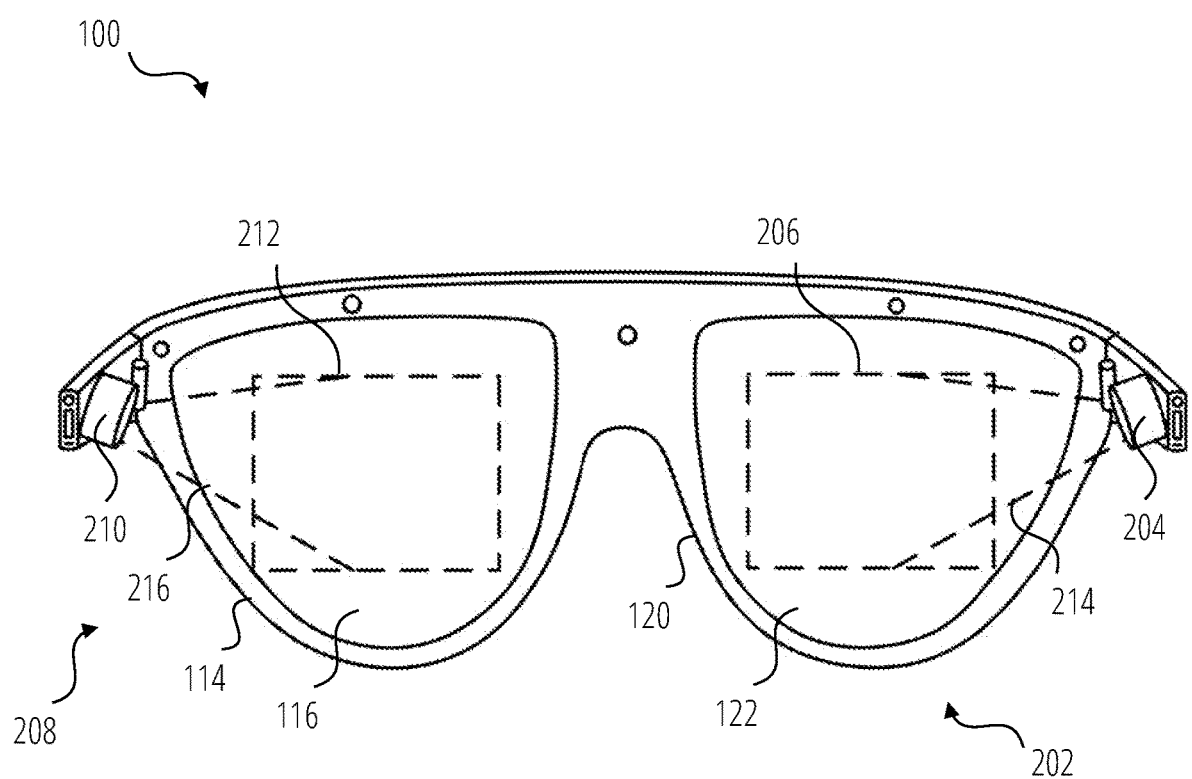
FIG. 2 illustrates a further view of the augmented reality wearable device of FIG. 1 from the perspective of the user, in accordance with some examples.

FIG. 2 illustrates the glasses 100 from the perspective of a wearer. For clarity, a number of elements shown in FIG. 1 have been omitted. As described in FIG. 1, the glasses 100 shown in FIG. 2 include left optical element 116 and right optical element 122 secured within each of the left optical element holder 114 and the right optical element holder 120, respectively.

The glasses 100 include a right forward optical assembly 202 comprising a right projector 204 and a right near eye display 206, and a left forward optical assembly 208 comprising a left projector 210 and a left near eye display 212.

In one example, the near eye displays are waveguides. The waveguides include reflective or diffractive structures (e.g., gratings and/or optical elements such as mirrors, lenses, or prisms). Right projected light 214 emitted by the right projector 204 encounters the diffractive structures of the waveguide of the right near eye display 206, which directs the light towards the right eye of a user to provide an image on or in the right optical element 122 that overlays the view of the real world seen by the user. Similarly, left projected light 216 emitted by the left projector 210 encounters the diffractive structures of the waveguide of the left near eye display 212, which directs the light towards the left eye of a user to provide an image on or in the left optical element 116 that overlays the view of the real world seen by the user.

It will be appreciated however that other display technologies or configurations may be provided that can display an image to a user in a forward field of view. For example, instead of a right projector 204 or a left projector 210 and a waveguide, an LCD, LED or other display panel or surface may be provided instead.

In use, a wearer of the glasses 100 will be presented with information, content, AR effects, virtual objects and various user interfaces on the near eye displays. As described in more detail below, the user can then interact with the glasses 100 using a touchpad and/or the buttons (not shown), by gestures within the field of view of the cameras, as well as by providing voice inputs or touch inputs on an associated device, for example client device 404 illustrated in FIG. 15.

Figure 3:
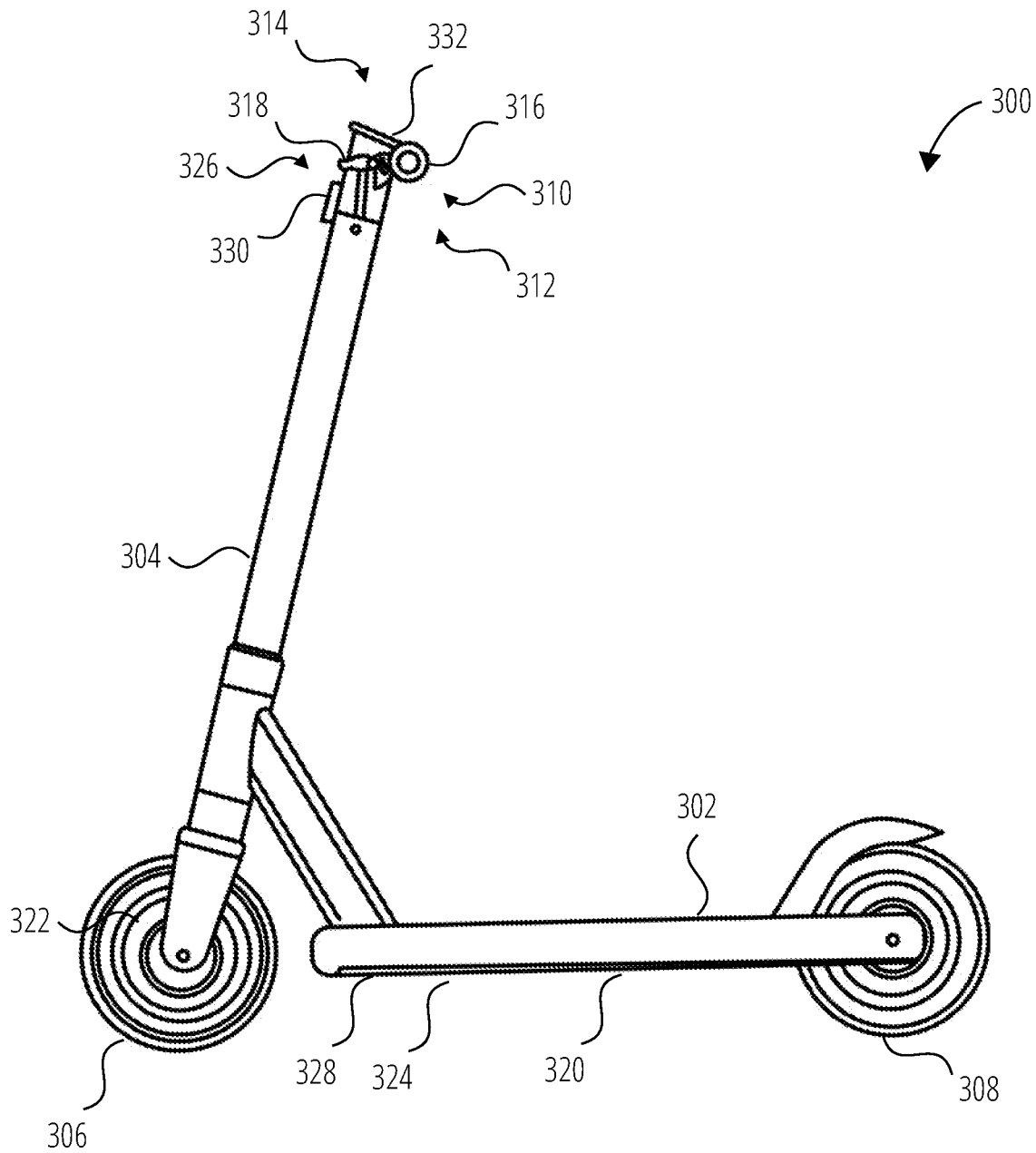
FIG. 3 is a side view of a personal mobility system, in accordance with some examples.

FIG. 3 is a side view of a personal mobility system (e.g., a scooter 300), in accordance with some examples. The scooter 300 comprises a main body 302 with at least two wheels (i.e., front wheel 306 and rear wheel 308) mounted to the main body 302. The main body 302 provides a platform for at least a single user to stand on (or sit on with a seat secured to the main body 302). The scooter 300 further includes a steering column 304 coupled to at least one of the wheels (i.e., front wheel 306). In some examples, each of the front wheel 306 and rear wheel 308 comprises a wheel hub, spokes, a wheel rim and tire. The steering column 304 is rotatably coupled to the main body 302 to permit steering of the front wheel 306.

The steering column 304 further comprising handlebars 310 extending at a substantially perpendicular orientation from the steering column 304 with the handlebars 310 set at a height for a user to steer the scooter 300 while riding. The handlebars 310 may include a left handle 312 and a right handle 314. The left handle 312 includes an acceleration control 316 and a brake control 318 operably connected to the brake of at least one of the front wheel 306 and the rear wheel 308. As will be discussed in further detail below, each of the acceleration control 316 and brake control 318 is operably connected to a management system 324.

The scooter 300 also includes a power source 320, a propulsion source 322, a management system 324, and forward-looking sensors 326.

The power source 320 and the propulsion source 322 are each independently operably connected to the management system 324. The acceleration control 316 and the brake control 318 are also each independently operably connected to the management system 324, although in some cases the brake control 318 may only be physically coupled to a manual brake system. In operation the user provides inputs through the acceleration control 316 and the brake control 318 to the management system 324 for starting, maintaining, changing and ceasing movement of the scooter 300. Additionally, regenerative braking may be provided via the acceleration control 316. As will be further discussed below, the user may also provide inputs through at least one of the glasses 100 and a client device 404. The management system 324 directs the flow of energy from the power source 320 to the propulsion source 322.

The propulsion source 322 further comprises a motor, a power linkage to the management system 324, and mechanical linkage to at least one of the front wheel 306 and the rear wheel 308 so that the propulsion source 322 can drive at least one of the wheels. For the sake of clarity, the motor may directly drive the wheels or indirectly drive the wheels via a chain/sprocket/drive shaft/transmission/or other indirect drive means. In some implementations, the brake and propulsion source may be disposed within the hub of at least one of the front wheel 306 and the rear wheel 308. In the implementation illustrated in FIG. 3, the propulsion source 322 is located in the front wheel 306. The brake can include front and rear drum or disk brakes operably connected to the brake control 318. Other types of brakes such as cantilever, and V-brakes may also be used.

The power source 320 may be disposed within the main body 302 and may be charged by the management system 324, which in turn receives power from an outside power source through a connector 328. In some implementations, the power source 320 is removable, allowing a user to swap power sources 320 and to charge each power source 320 away from the scooter 300.

Additionally, the management system 324 is operatively connected to the forward-looking sensors 326 and the visual feedback element 332. The forward-looking sensors 326 are disposed within the sensor housing 330 and mounted to the steering column 304 so that the forward-looking sensors 326 have an unobstructed view in the direction of travel of the scooter 300. The forward-looking sensors 326 may include sensing technologies such as cameras, sonar sensors, radar sensors, laser sensors, and lidar sensors; as well as safety components such as lights or horns. The visual feedback element 332 faces the user and provides the user with information (e.g., power source status, speed, location, and other data received from the management system 324). The visual feedback element 332 may also include a communications module (such as Bluetooth transducer, antennas) operably connected to the management system 324. Additional elements of the scooter 300 will be discussed in further detail below with respect to the networked devices 1502. In some implementations, elements of the management system 324 are integrated into the networked device 1502.

Figure 4:
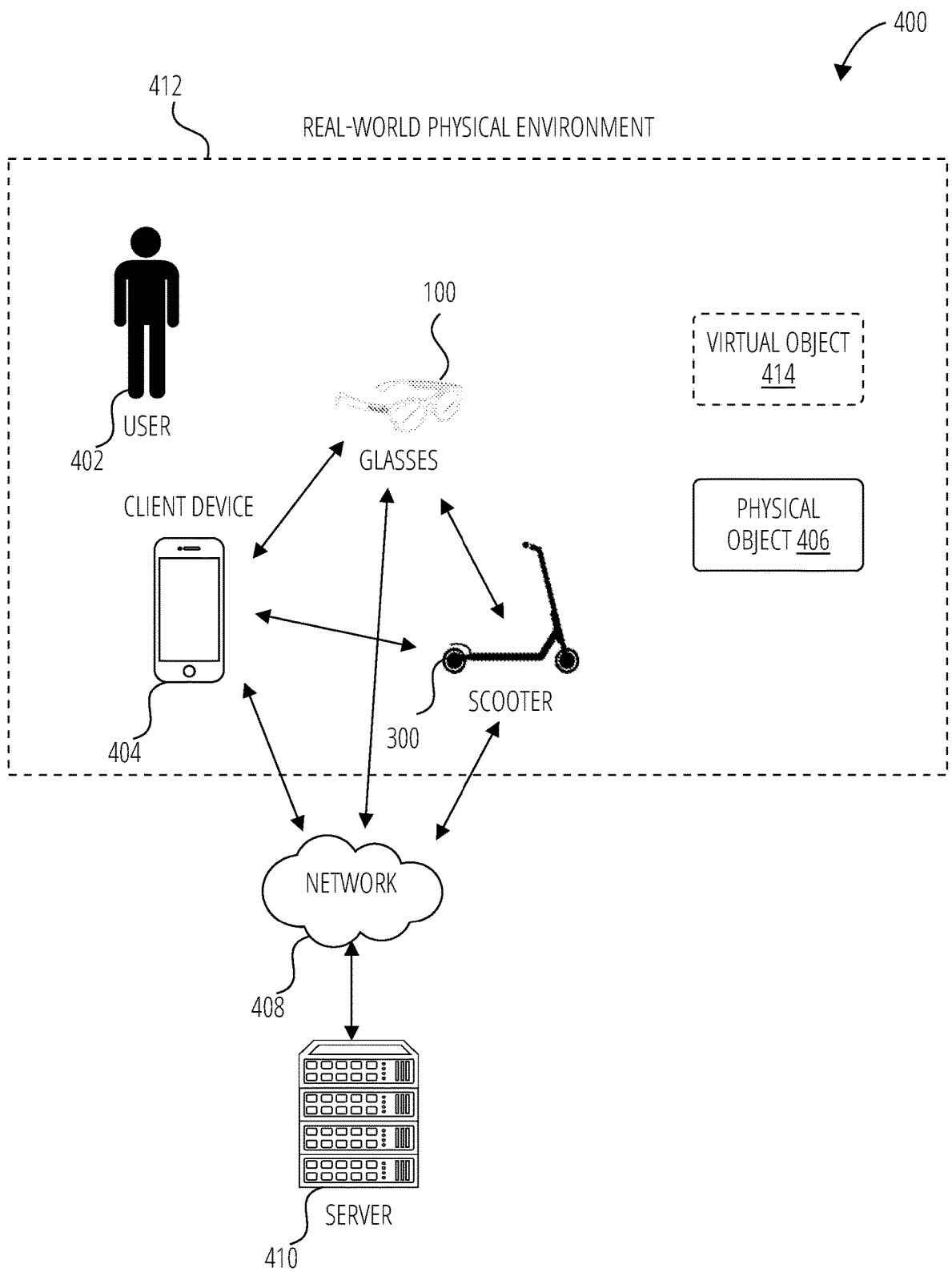
FIG. 4 illustrates a network environment suitable for operating an AR wearable device and a personal mobility system according to some examples.

FIG. 4 is a network diagram illustrating a network environment 400 suitable for operating an AR wearable device (such as glasses 100) and a personal mobility system (such as a scooter 300), according to some examples. The network environment 400 includes glasses 100, a scooter 300, a client device 404, and a server 410, communicatively coupled to each other directly or via a network 408. The glasses 100, scooter 300, client device 404, and the server 410 may each be implemented in a computer system, in whole or in part, as described below with respect to FIG. 17. The server 410 may be part of a network-based system. For example, the network-based system may be or include a cloud-based server system that provides additional information, such geographical location information or virtual content (e.g., three-dimensional models of virtual objects) to the glasses 100, the scooter 300, and the client device 404.

The client device 404 may be a smartphone, tablet, phablet, laptop computer, access point, or any other such device capable of connecting with the glasses 100 and the scooter 300 using both a low-power wireless connection and a high-speed wireless connection. The client device 404 is connected to the server 410 and the network 408. The network 408 may include any combination of wired and wireless connections. The server 410 may be one or more computing devices as part of a service or network computing system. The client device 404 and any elements of the server 410 and network 408 may be implemented using details of the software architecture 1602 or the machine 1700 described in FIG. 16 and FIG. 17.

A user 402 operates the glasses 100 and the scooter 300. The user 402 may be a human user (e.g., a human being), a machine user (e.g., a computer configured by a software program to interact with the glasses 100 and the scooter 300), or any suitable combination thereof (e.g., a human assisted by a machine or a machine supervised by a human). The user 402 is not part of the network environment 400 but is associated with the glasses 100, scooter 300, and the client device 404.

Although the AR wearable device in FIG. 4 is represented as glasses 100, the AR wearable device may be a computing device with a display such as a smartphone, a tablet computer, or other wearable computing device. The computing device may be hand-held or may be removably mounted to a head of the user 402. In one example, the display is a screen that displays what is captured with a camera of the computing device. In another example, the display of the device may be transparent, such as one or both of the left optical element 116 and the right optical element 122 of glasses 100.

The user 402 interacts with an application running on the glasses 100 or the client device 404 or a combination thereof. The application may include an AR application configured to provide the user 402 with an experience associated with a physical object 406, such as a two-dimensional physical object (e.g., a picture), a three-dimensional physical object (e.g., a statue, a car, a person), a specific location (e.g., a landmark), or any references (e.g., perceived corners of walls or furniture) in the real-world physical environment 412.

The AR application can also provide the user 402 with an experience associated with operation of the scooter 300 in addition to presenting information provided by the scooter 300. For example, the user 402 may point a camera 132 of the glasses 100, which captures an image or video feed of a physical object 406 (e.g., a stop sign, a traffic light, a pothole). The contents of the image or video feed are tracked and recognized in the glasses 100 using a local context recognition dataset module of the AR application of the glasses 100. The local context recognition dataset module may include a library of virtual objects or machine-learning models associated with real-world physical objects or references. The AR application then generates additional information related to the image or video feed (e.g., a three-dimensional model, a visual effect, an overlay of textual or symbolic information) and presents this additional information in a display of the glasses 100 in response to identifying features in the image or video feed. If the contents of the video feed or image are not recognized locally at the glasses 100, the glasses 100 may download additional information (e.g., the three-dimensional or machine learning model), from a database of the server 410 over the network 408 or may provide the image or video feed to an associated device (e.g., the client device 404 or server system 1508) for processing.

In one example, the server 410 is used to detect and identify the physical object 406 based on sensor data (e.g., image and depth data, location) from the glasses 100 or the scooter 300 and to determine a position or pose of at least one of the glasses 100, the scooter 300, and the physical object 406 based on the sensor data. The server 410 can also retrieve or generate a virtual object 414 based on the pose and position of the glasses 100, the scooter 300, the physical object 406, and, in some implementations, of the client device 404. The server 410 or the client device 404 communicates the virtual objects 414 to the glasses 100, which can then display the virtual objects 414 to the user 402 at an appropriate time. Alternatively, the data comprising the virtual objects could be stored in local memory in the client device 404, glasses 100 The object recognition, tracking, virtual object generation and AR rendering can be performed on either the glasses 100, the scooter 300, the client device 404, the server 410, or a combination thereof.

Any of the machines, databases, or devices shown in FIG. 4 may be implemented in a general-purpose computer modified (e.g., configured or programmed) by software to be a special-purpose computer to perform one or more of the functions described herein for that machine, database, or device. For example, a computer system able to implement any one or more of the methodologies described herein is discussed below with respect to FIG. 16 FIG. 17. As used herein, a "database" is a data storage resource and may store data structured as a text file, a table, a spreadsheet, a relational database (e.g., an object-relational database), a triple store, a hierarchical data store, or any suitable combination thereof. Moreover, any two or more of the machines, databases, or devices illustrated in FIG. 4 may be combined into a single machine, and the functions described herein for any single machine, database, or device may be subdivided among multiple machines, databases, or devices.

The network 408 may be any network that enables communication between or among machines (e.g., server 410), databases, and devices (e.g., glasses 100). Accordingly, the network 408 may be a wired network, a wireless network (e.g., a mobile or cellular network), or any suitable combination thereof. The network 408 may include one or more portions that constitute a private network, a public network (e.g., the Internet), or any suitable combination thereof.

Figure 5:
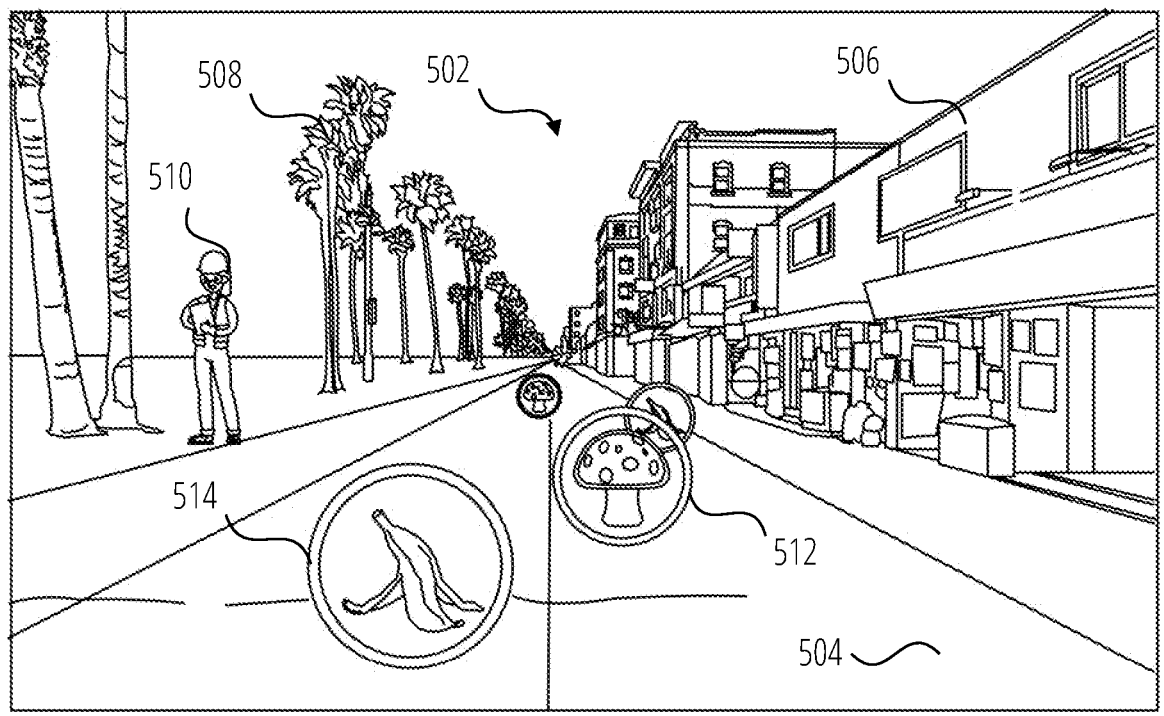
FIG. 5 is a view of an outdoor environment that has been enhanced with AR elements that are displayed on the displays of the glasses of FIG. 1 according to one example.

FIG. 5 is a view of an outdoor environment 502 that has been enhanced with AR elements that are displayed on the displays 1516 of the glasses 100 according to one example. In this example, a user is riding a scooter 300 along a street or pathway 504 in the environment 502, which includes buildings 506, trees 508, people 510 and so forth. The pose of the glasses 100 relative to the environment 502 has been determined and is continually updated using known AR localization and tracking techniques, including for example by a visual processing technique such as Simultaneous Localization and Mapping (SLAM). The pose of the glasses 100 can be refined and the particular identity and characteristics of the environment can be further determined by comparing SLAM data with existing point cloud models for the environment 502, stored in on a server 410 or downloaded to the glasses 100, client device 404 or scooter 300. Additionally, the location of the glasses 100, scooter 300 or client device 404 can be determined from GPS coordinates, or by these devices sharing location information with each other.

The pose of the glasses 100 permits virtual objects to be displayed to the user in the frame of reference of the environment. That is, a virtual object such as a power up 512 (illustrated as a mushroom) and a power down 514 (illustrated as a banana) can be displayed by the glasses 100 in a fixed position on the pathway 504. As the user turns their head or approaches one of the virtual objects, its apparent position on the pathway 504 is maintained, with appropriate scaling as the user approaches or recedes from the virtual object. The positions of the virtual objects 414 can be predefined for a particular location (for example along a popular trail) or can be positioned intermittently by the AR application. In one example, the positions and identities of the virtual objects 414 are defined in a map of the environment that is stored on the client device 404 or on the server 410 and, which is or accessed by the AR application based on the pose and location of the glasses 100. Similarly, the data defining individual virtual objects 414 including their appearance and performance-altering characteristics are stored in a database hosted on the server 410 or locally on the client device 404.

Since the position of the user in the environment 502 is known (being the position of the scooter 300, glasses 100 or client device 404), and the positions of the virtual objects 414 in the environment 502 are known, the user can interact with the virtual objects by riding over or through them as perceived by the user. The effect of such an interaction will depend on the nature of the virtual object. For example, when the scooter 300 passes over (the location of) a power up 512, the power of the scooter 300 that is available for use can be increased, or the maximum speed of the scooter can be increased, typically for a certain amount of time. Similarly, when the scooter 300 passes over a power down 514, the power of the scooter 300 that is available for use can be decreased, or the maximum speed of the scooter can be decreased, typically for a certain amount of time or it can be brought completely to a halt. In this way, interaction with a virtual object can affect the behavior or characteristics of real devices such as the scooter 300. It will of course be appreciated that the scooter 300 itself does not actually ride over the virtual object 414, but rather the position of the scooter 300 at the perceived location of the virtual object 414 is detected by the glasses 100, the client device 404 or the scooter 300.

In another example, interaction with virtual object such as the power up 512 as shown in FIG. 5, can result in the virtual object 414 being acquired by the user for use at a later time, in which case the virtual object may be transferred to and positioned in a frame of reference of the glasses 100 or the scooter 300 as described in more detail below with reference to FIG. 6. In such a case, further interaction with the virtual object by the user is required to trigger the change in behavior or characteristics of the scooter 300 as discussed above. The user can thus acquire a power up 512 or other virtual object and choose to use it at a time of their choosing.

Figure 6:
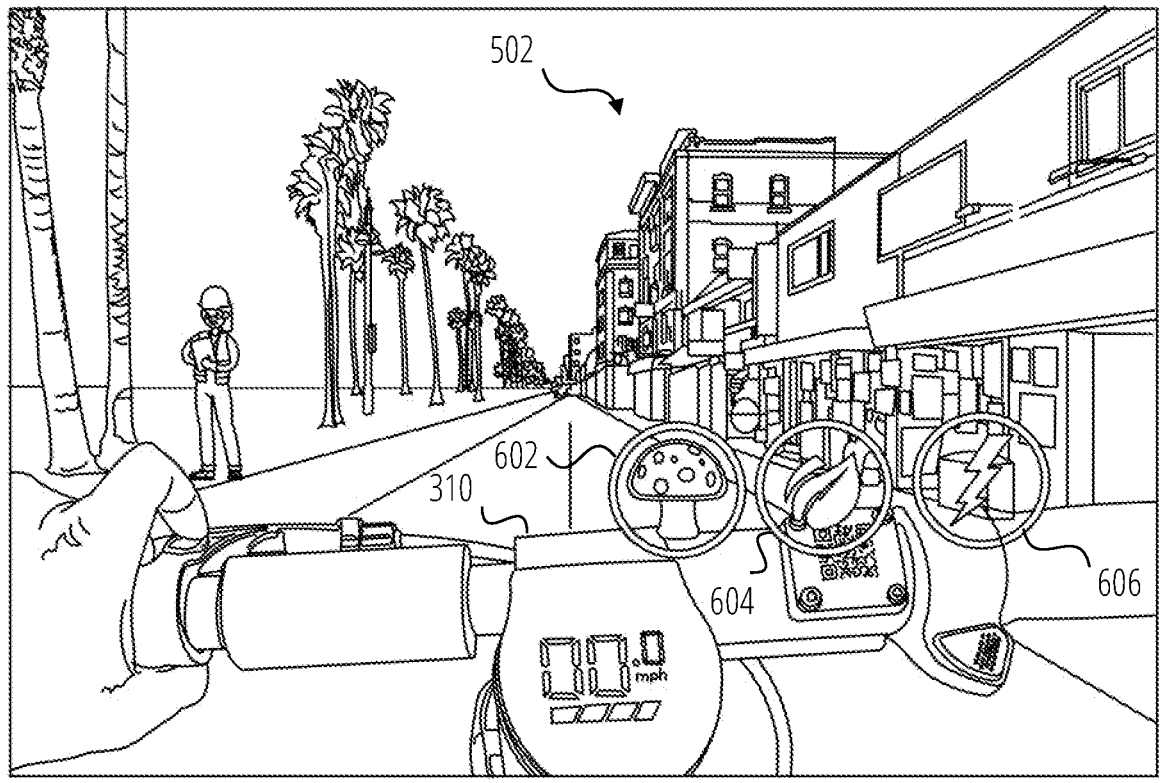
FIG. 6 is a view of the handlebars of a scooter in an outdoor environment, in which the scooter has been enhanced with AR elements according to one example.

FIG. 6 is a view of the handlebars 310 of scooter 300 in an outdoor environment 502, in which the scooter 300 has been enhanced with AR elements according to one example. In this case, virtual objects such as power up 602, eco mode 604 and sport mode 606 are displayed to the user, by the glasses 100, in the frame of reference of the scooter 300. In this example, the virtual objects are shown as floating just above the handlebars 310 of the scooter 300. As the user 402 turns their head or gets closer to or further from one of the virtual objects, its position on the handlebars 310 is maintained, with appropriate scaling as the user approaches or recedes from the virtual object.

The virtual objects illustrated in FIG. 6 may be persistent in the frame of reference of the scooter 300, for example the eco mode 604 and sport mode 606 virtual objects may represent features or adjustments to the operation of the scooter that are available at all times during operation of the scooter 300. In this way, the available control features of the scooter can be extended beyond those that are available using the physical controls on the scooter.

The virtual objects 414 illustrated in FIG. 6 may also appear and disappear during operation of the scooter, for example they may appear as they become available for use and may then disappear after use. In one case, when a scooter rides over a power up 512 as shown in FIG. 5, it will disappear from the pathway 504 and appear as the power up 602 in the frame of reference of the scooter 300 as shown in FIG. 6. This can occur when the performance-modifying effect of the power up 512 does not occur immediately when the scooter 300 arrives at the position in the real world corresponding to the location of the power up 512 but is rather delayed until such time as the user decides to activate it as discussed below. The power up 512 has effectively been acquired rather than activated by passage of the scooter 300.

To facilitate positioning of the virtual objects 414 in FIG. 6, The handlebars 310 are detected by the glasses 100 or the client device 404 within the field of view of the cameras 132 of the glasses 100 using object detection techniques applied to a video feed from the cameras 132. Using 3D reconstruction techniques, the relative position and orientation between the glasses 100 and the handlebars 310 can be determined by the glasses 100 or the client device 404, permitting the correct placement of the virtual objects above the handlebars 310 as the relative position between the handlebars 310 and the glasses 100 change due to user or handlebar movement.

In another example, the relative position and orientation of the scooter 300 and the glasses 100 can be determined by comparing their individual poses in a common local or global frame of reference. In such a case it will be necessary for the scooter 300 to provide data relating to an angle through which the handlebars are turned in order to fix the virtual objects to the handlebars 310 in the user's field of view. Alternatively, the virtual objects could be fixed with reference to the main body 302 or steering column 304, to float in a fixed orientation above the handlebars 310 or (other portion of a personal mobility system) regardless of the orientation of the handlebars 310.

In use of the example shown in FIG. 6, the intersection of a user's hand or finger(s) with one of the virtual objects (power up 512, eco mode 604, sport mode 606) is detected in the video feed from one or both of the cameras 132 using gesture detection or other visual object intersection techniques. In response to such detection, an instruction is provided by the glasses 100 or the client device 404 to modify the behavior of the scooter 300 appropriately based on the particular virtual object with which the user has interacted.

Figure 7:
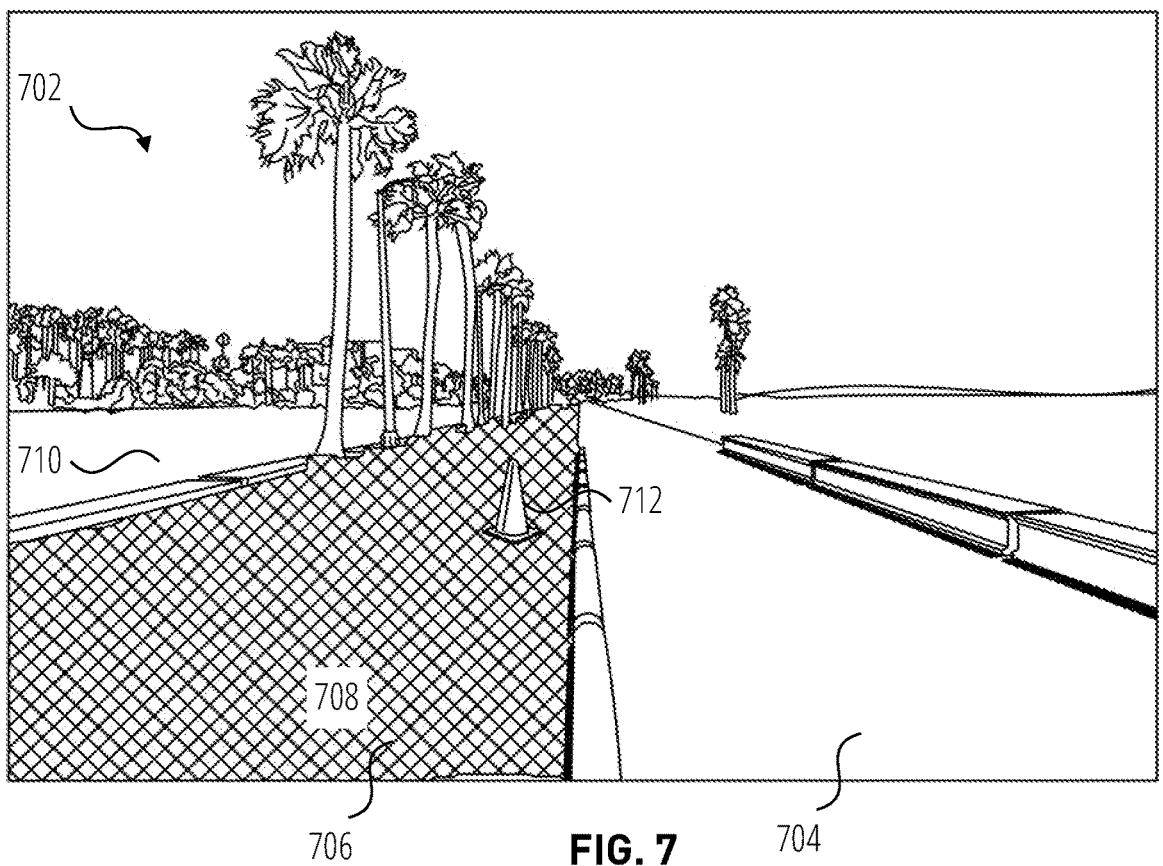
FIG. 7 is a view of an outdoor environment that has been enhanced with AR elements that are displayed on the displays of the glasses of FIG. 1 according to an example.

FIG. 7 is a view of an outdoor environment 702 that has been enhanced with AR elements that are displayed on the displays 1516 of the glasses 100 according to one example. As before, a user is riding a scooter 300 through the outdoor environment 702. The pose of the glasses 100 relative to the environment 702 has been determined and is continually updated using known AR localization and tracking techniques, including for example by a visual processing technique such as Simultaneous Localization and Mapping (SLAM). The pose of the glasses 100 can be refined and the particular identity and characteristics of the environment can be further determined by comparing SLAM data with existing point cloud models for the environment 702, stored in on a server 410 or downloaded to the glasses 100, client device 404 or scooter 300. Additionally, the location of the glasses 100, scooter 300 or client device 404 can be determined from GPS coordinates, or by these devices sharing location information with each other.

In this example, the environment 702 includes a walking path 704, a bicycle path 706 a street 710 and a traffic cone 712 located on the bicycle path 706 to indicate a hazard in the bicycle path 706. Personal mobility systems are not permitted on the walking path 704 but only on the bicycle path 706 in this example. To assist the user with navigating the environment, one or more virtual objects 414 are placed in the user's field of view as displayed by the glasses 100. In this example, a colored AR overlay 708 is positioned over the bicycle path 706 to highlight the path that the user is permitted to take, thereby facilitating correct riding etiquette. Alternatively, forbidden areas (such as the walking path 704) or more hazardous areas (such as a street 710 with cars) can be provided with an overlay instead of or in addition to the AR overlay 708 on the bicycle path 706. Different colors or effects may be used to distinguish the correct path or area that can be traversed by the scooter 300 from forbidden or hazardous areas.

As with the examples discussed above, interaction with the AR overlay 708 by proximity of the scooter 300 to the location in the environment of the AR overlay 708 can affect the behavior and character of the scooter. In the case of the AR overlay 708, positioning of the scooter on the bicycle path 706 (that is on the AR overlay 708 as perceived by the user) can enable operation at the full capability of the scooter 300, while departing from the bicycle path 706 (or from the AR overlay 708 as perceived by the user) can result in reduced functioning of the scooter 300. Additional effects may also be provided to prompt the user to use the correct path, for example by changing the color or other effects (for example flashing or pulsing) of the AR overlay 708 as displayed by the glasses 100 when the scooter leaves the bicycle path 706. Alternatively, if overlays or other virtual objects 414 are provided on the walking path 704 or the street 710, positioning of the scooter 300 on the overlay or intersecting with the virtual object can trigger reduced functioning of the scooter 300, which is unchanged when the scooter 300 is positioned on the bicycle path 706.

The AR application running on either the glasses 100 or client device 404 may also scan for relevant physical objects or features in the environment 702 using known object detection and recognition techniques. For example in FIG. 7, the traffic cone 712, which is an indicator that a hazard may be present in the bicycle path 706, can be detected by the glasses 100 or client device 404. A virtual object 414 can then be displayed by the glasses 100 to highlight the traffic cone. For example, a pulsing or flashing high-contrast AR overlay can be placed on or around the traffic cone 712 in the scene as viewed by the user through the glasses 100.

Any physical object 406 that is a hazard, identifies a hazard, or provides other relevant information to a rider of a personal mobility system can be highlight in this manner, including crosswalks, signage, caution tape, and so forth.

In addition to emphasizing the physical object, the behavior of the personal mobility system can be altered in response to proximity with the hazard. For example, the brakes could be applied or the maximum speed or power could be reduced as before as the user 402 approaches the hazard.

Figure 8:
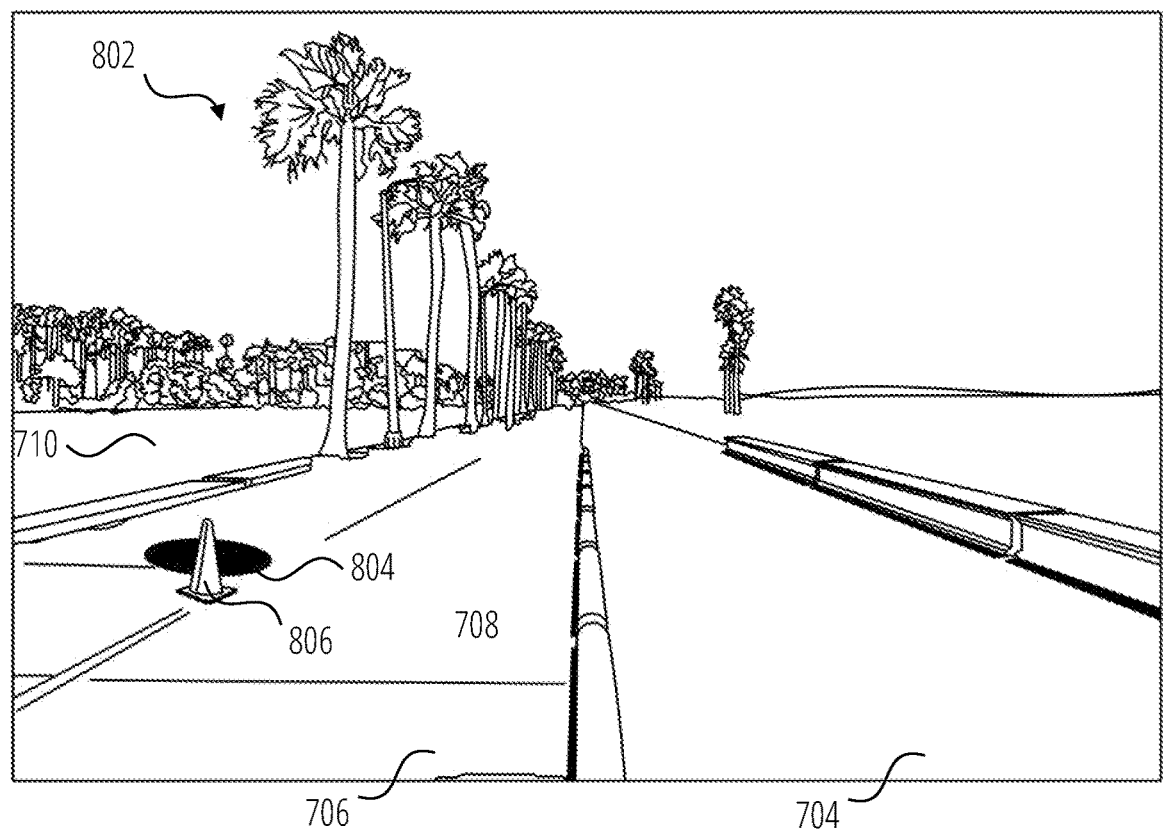
FIG. 8 is a view of an outdoor environment that has been enhanced with AR elements that are displayed on the displays of the glasses of FIG. 1 according to another example.

FIG. 8 is a view of an outdoor environment 802 that has been enhanced with AR elements that are displayed on the displays 1516 of the glasses 100 according to another example. As before, a user is riding a scooter 300 through the outdoor environment 802. Also as before, the environment 802 includes a walking path 704, a bicycle path 706 and a street 710. As for environment 702 discussed with reference to FIG. 7, AR overlay 708 has been provided to highlight the bicycle path 706.

In this example, the AR application running on either the glasses 100 or client device 404 has detected an otherwise unmarked hazard (a pothole 804) in the environment 702 using known object detection and recognition techniques. In one example, the object detection and recognition is performed using a context or location-specific ML model for potential obstacles or objects that is loaded into the memory of the glasses 100 or client device 404. This reduces the data processing burden since the glasses 100 or client device 404 need only search for potential obstacles or warning signs that may be present in that context or at that location. For example, the context-specific ML model will not include road signs if the user 402 is riding on a mountain bike trail.

In the example of FIG. 8, in response to detecting the pothole 804, a virtual traffic cone 806 is displayed by the glasses 100 at the perceived location of the pothole 804 in the field of view of the glasses 100. Various effects can be applied. For example, a pulsing or flashing high-contrast AR overlay can be placed on or around the virtual traffic cone 806 in the scene as viewed by the user through the glasses 100.

Any physical object 406 that is a hazard, identifies a hazard, or provides other relevant information to a rider of a personal mobility system can be highlight in this manner, including crosswalks, signage, potholes, sinkholes, trenches, ditches and so forth. Other virtual signage, such as a sign with "DANGER AHEAD," can be placed over or in front of a physical hazard such as the pothole 804 in the field of view of the glasses 100, in addition to or instead of the virtual traffic cone 806.

In addition to emphasizing the physical object, the behavior of the personal mobility system can be altered in response to proximity with the pothole 804. For example, the brakes could be applied or the maximum speed or power could be reduced as before.

Figure 9:
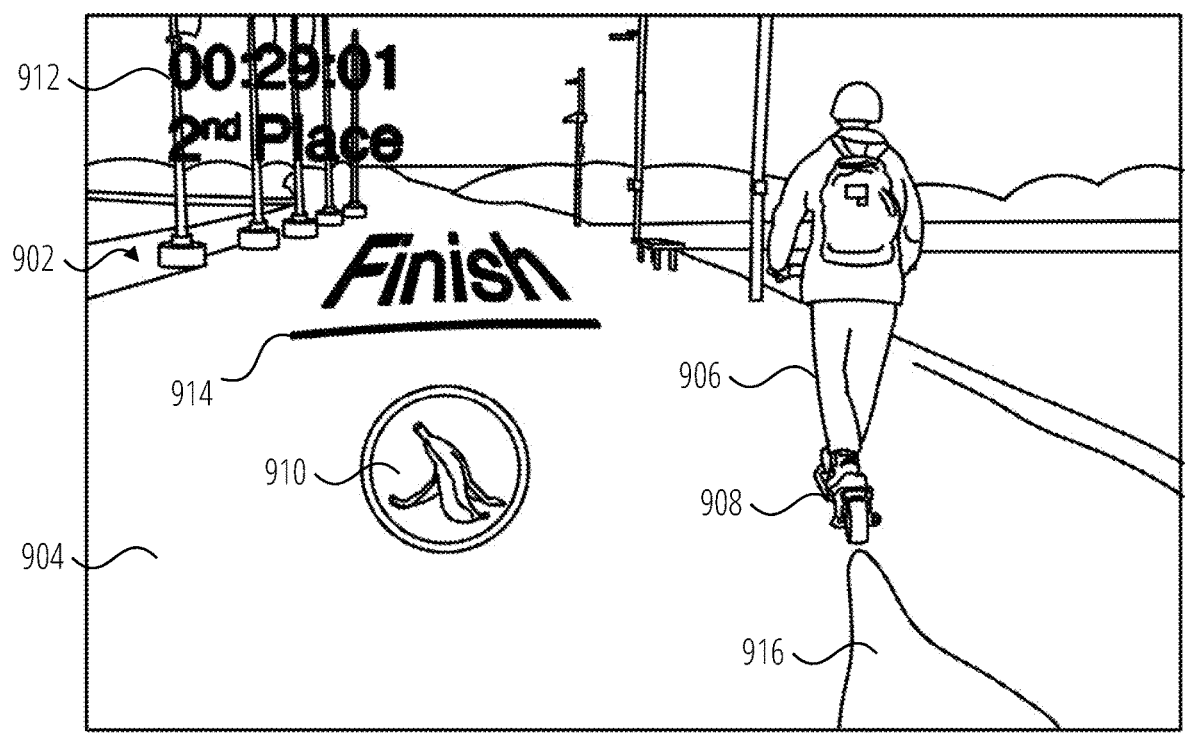
FIG. 9 is a view of an outdoor environment that has been enhanced with AR elements that are displayed on the displays of the glasses of FIG. 1 according to another example.

FIG. 9 is a view of an outdoor environment 902 that has been enhanced with AR elements that are displayed on the displays 1516 of the glasses 100 according to another example. As before, a user is riding a scooter 300 through the outdoor environment 902. In this case, the user is riding collaboratively or competitively with a friend 906 on another scooter 908. The user and the friend are riding along a pathway 904 on a shared virtual race course that has been defined along the pathway 904.

The AR elements shown on the user's display include items that are unique to the user as well as items that are common to those displayed on a corresponding AR device (such as glasses 100) worn by the friend 906. In the illustrated embodiment, a power down 910 and a virtual finish line 914 are or can be seen by both the user and the friend 906 (depending on where they are looking, that is where their glasses 100 are pointing), with appropriate adjustments to size, location and orientation in the field of view of the glasses 100 of both the friend 906 and the user. That is, these objects are, from the perspective of both participants, located in the same physical location in the real world but in different locations in the frame of reference of their respective glasses 100. Additional virtual objects or AR elements can be displayed as shared, including for example indicators of the race course surface (such as an AR overlay 708 as shown in FIG. 7) or track borders or directional arrows shown to illustrate the course to the user and the friend 906.

The AR elements shown on the user's display that are unique to the user may for example include status information 912, which may be fixed at the top left of the field of view of the glasses 100, and AR effects such as a virtual plume 916 that appears to be emanating from the rear of the friend's scooter 908. The virtual plume 916 may vary in color or appearance to distinguish between different participants. The status information 912 may be included in each participant's display, appropriately modified for that participant. As shown, the status information 912 can include an elapsed time and the user's position (2nd Place) in the race, lap time, finish time and position (once the virtual finish line 914 is crossed), points accrued, a race and season leader board, information about other participants such as ranking, username, riding level, and so forth.

In use, the course is accessed by the participants in a shared session in which they can, for example, race against each other. The session can be scheduled and created using a messaging or social media application running on participants' client devices 404 or glasses 100. Shared sessions can be by invitation or advertised as available based on proximity of the user's friends (as represented by the proximity of their respective client devices 404 or glasses 100) to the start point. Virtual objects 414 such as power ups 512 and power downs 514 are available to the participants for interaction as discussed above, and intersection or proximity to a virtual object 414 will similarly affect each user's scooter as discussed above, to provide a boost or handicap or other effect depending on the virtual object. Virtual objects 414 can include start/stop designators, navigational cues, real-world object warnings, a virtual value object (e.g., coins or upgrades that increase or decrease a score), or performance modifying objects, and so forth.

Virtual objects 414 can be persistent (that is, they remain available to other participants even when one participant has used or acquired a virtual object) or they can vanish from the course for other participants once one participant has acquired or used it. Additionally, virtual objects 414 could respawn after a certain amount of time, or for each lap of the course, depending on their properties. Furthermore, some virtual objects 414 can be acquired for later use as described with reference to FIG. 6. Users can ride through previously created tracks on their own or with other users at the same time. Metrics (e.g., scores or lap times) are then shared between participants within the multiplayer environment and they are ranked accordingly. In an example, when two users are competing in the same course at the same time, the AR device can display information about other players (e.g., ranking, username, riding level). In this example, standard localization methods (e.g., GPS) or the localization/detection methods described in can be used to generate and display information about other riders during competition.

Figure 10:
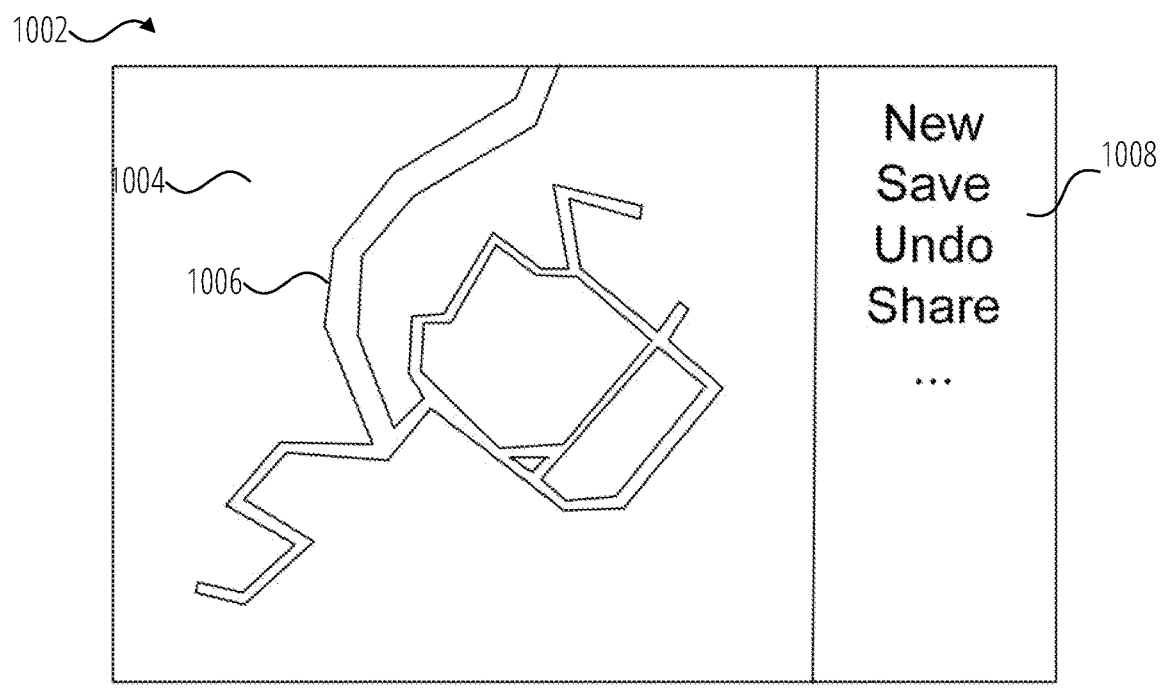
FIG. 10 illustrates a user interface 1002 for an environment building mode according to one example.

FIG. 10 illustrates a user interface 1002 for an environment building mode according to one example. The user interface 1002 includes a map 1004 with roads 1006 or other geographical features and a menu 1008. The user interface 1002 is displayed on the display of a computing device such as client device 404, glasses 100, a tablet or laptop computer and so forth. The menu 1008 includes options for creating a new course, saving a course that is being or has been created, an undo feature to reverse the last editing action and a share feature. Additional editing features may be provided.

The map 1004 may be displayed based on the proximity of the computing device or may be a location that has been found or specified by the user by searching for or entering a specific location. The user interface 1002 permits a user to creates a virtual track or course, fixed relative to the real world, and including virtual objects as discussed above. This course can then be ridden by one or more users in a competitive or recreational or collaborative gameplay mode as discussed above.

Figure 11:
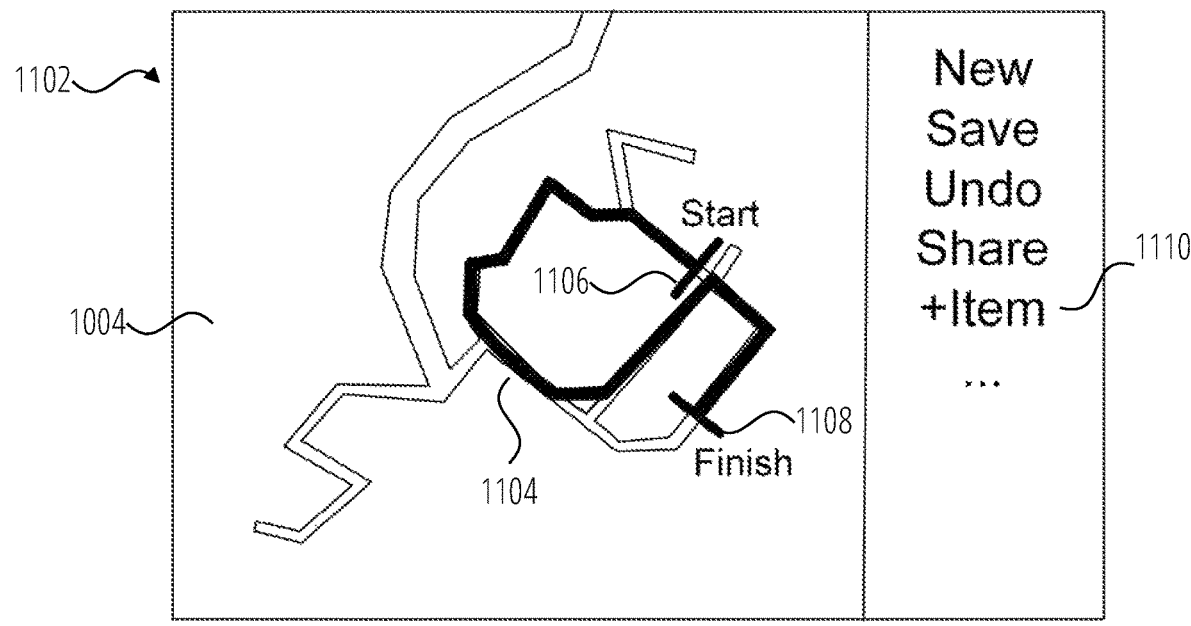
FIG. 11 illustrates the user interface of FIG. 10 in which a course has or is being created.

FIG. 11 illustrates the user interface of FIG. 10 in which a course has or is being created. The user interface 1102 shows a course 1104 with a starting line 1106 and a finish lines 1108. In one example, a user first creates the course (e.g., a continuous path or a series of waypoints) by physically riding through the desired course while wearing the glasses 100. In this example, the user interface 1102 in response to receiving a "New" input provides an option to "Record New Course." In response to receiving selection of this option by the user, the glasses 100 or client device 404 captures a sequence of location information corresponding to the position of the glasses 100, client device 404 or scooter 300 until a "Stop Recording" input is received from the user. The course is then defined with the starting line 1106 being when the "Record New Course" input was received and with the finish line 1108 being when the "Stop Recording" input is received and the track of the course being defined by the sequence of captured location information.

In addition to recording the basic path taken by the scooter while capturing the location information, the glasses 100 may perform object recognition or 3D reconstruction to detect relevant boundaries for defining the course, for example the edges of a path or a road on which scooter is riding. The course can then be defined by such boundaries rather than just by the track of the scooter. Similarly, the recorded track can be compared by one of the computing devices in the system (such as client device 404 or server 410 and so forth) with the boundaries of known routes (paths, roads and so forth) along the recorded path. The boundaries of the course can then be set by the relevant computing device as the boundary of the corresponding route.

In another example, the course is created in response to user inputs on the user interface 1102. For example, in response to receiving a "New" input in the user interface 1002, sequential touch inputs could be received on a display with a touchpad (such as on client device 404) to define the starting line 1106, turns and finish line 1108. Various editing options could be provided, for example to move a turning point by pressing, holding and dragging it, by receiving "Undo" commands, and so forth.

Also illustrated in user interface 1102 is a "+ Item" menu option 1110, which can be used to add virtual objects or other information to the course 1104.

Figure 12:
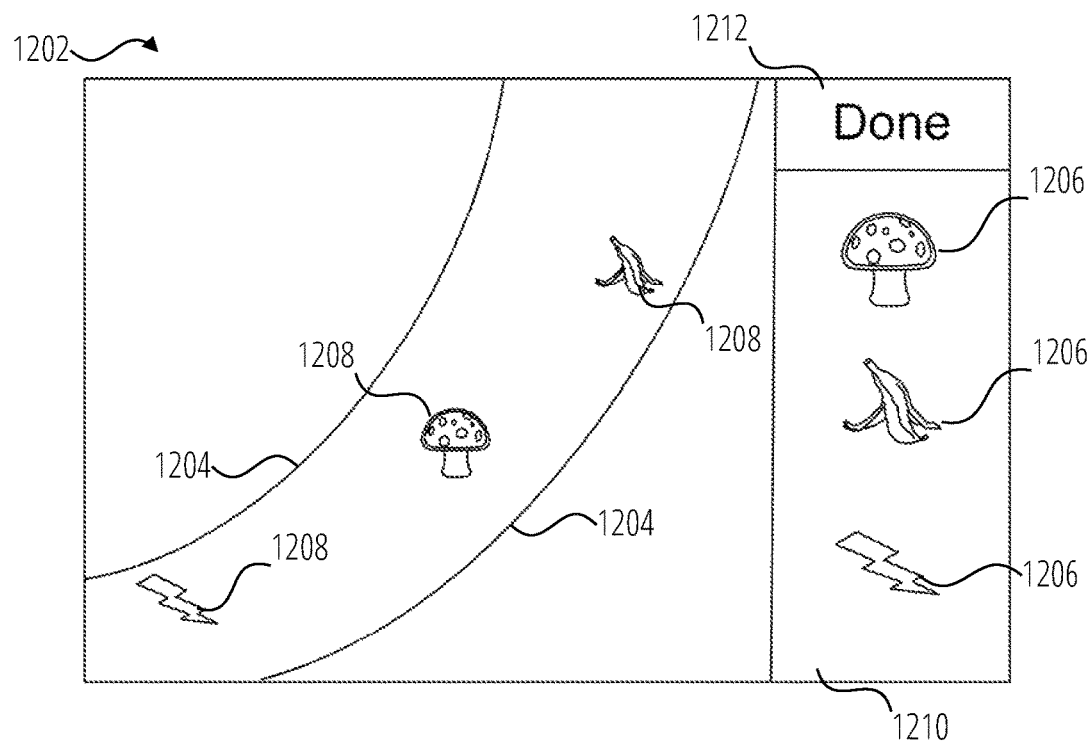
FIG. 12 illustrates the user interface of FIG. 10 in which virtual objects 414 are being placed on a course that is being or has been defined as described with reference to FIG. 11.

FIG. 12 illustrates the user interface of FIG. 10 in which virtual objects 414 are being placed on a course that is being or has been defined as described with reference to FIG. 11. The user interface 1202 is displayed in response to receiving selection of the "+ Item" menu option 1110 shown in FIG. 11. As can be seen, the user interface 1202 includes a number of available virtual objects 1206, which can be dragged and dropped from the menu 1210 onto the course 1104, which is illustrated in FIG. 12 by course boundaries 1204. Placed virtual objects 1208 are shown in the user interface 1202, which can be moved by drag inputs or deleted in response to a long press on a placed available virtual object 1206 followed by selection or confirmation of a delete option. In response to receiving an input on "Done" menu option 1212, the display will revert to user interface 1102.

When the course 1104 has been finalized, upon receipt of a Save or Share input, the corresponding action is taken. In one example, the course may be shared via a message composed in a chat interface of a messaging application and sent to one or more of a user's connections or friends. The Share message may include an invitation to ride the course, as well as time, date and location information and an RSVP option.

Figure 13:
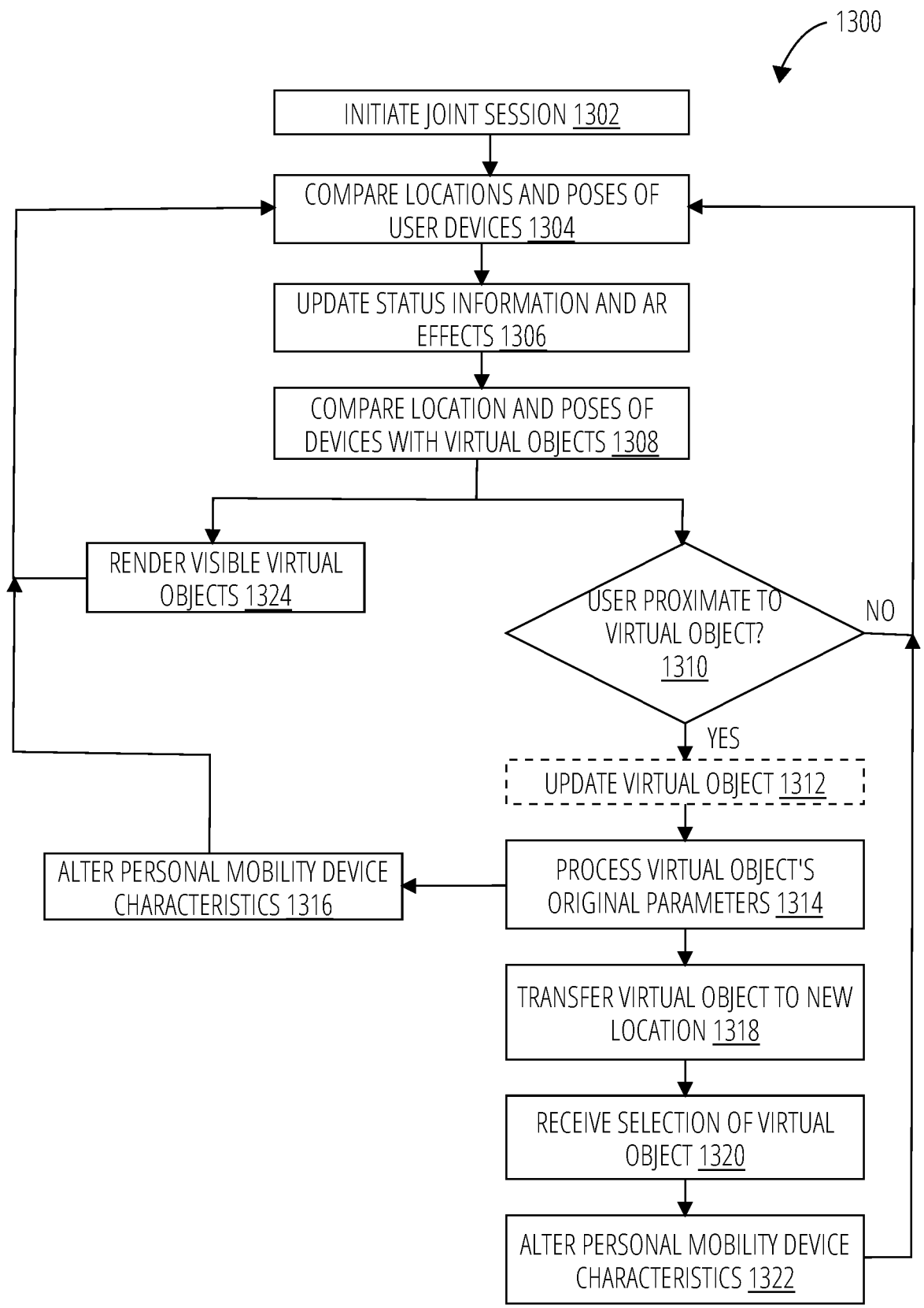
FIG. 13 is a flowchart showing operation of the network environment of FIG. 4, according to one example.

FIG. 13 is a flowchart 1300 showing operation of the network environment 400, according to one example. In this example, two or more participants are going to compete against each other on a course that has been defined as described with reference to FIG. 10 to FIG. 12 and FIG. 14.

The operations illustrated in FIG. 13 will typically execute on a combination of client device 404 and glasses 100, although the operations may execute exclusively in glasses 100 or in a combination of the glasses 100 and one or all of client device 404, scooter 300 and server 410. In the case of a collaborative or competitive session as contemplated, the operations in FIG. 13 will execute on each user's devices. Various implementations are of course possible. In one example, the operations are performed jointly between the glasses 100, which provides a video feed for processing from at least one of its cameras 132 and positional information from its IMU and GPS receiver to an AR application running on the client device 404, which processes the video feed, performs any required 3D reconstruction and tracking, and generates and transmits AR effects, including virtual objects 414, to the glasses 100 for display to the user 402. For the purposes of clarity, flowchart 1300 is discussed herein with reference to such an example.

Prior to the commencement of the flowchart 1300, localization and tracking of the glasses 100 has commenced and is ongoing for all participants. The pose of the glasses 100 and their location in the environment 502 is thus known to the glasses 100 and the AR application running on the corresponding client device 404. Additionally, if required, the locations and poses of related devices such as the scooter 300 or client device 404 are determined and communicated as needed between the glasses 100, scooter 300 and client device 404 for a particular participant.

A map of the environment, including the location of the virtual objects 414 and the course 1104, has been downloaded or is available for download to the participants' client devices from server 410. In the case of detection of hazards (including identifiers of hazards), such as in FIG. 7 or FIG. 8, each client device 404 has been and continues to perform object detection and recognition techniques to identify and locate hazards within the field of view of the glasses 100. Once a hazard has been identified, a corresponding virtual object 414 is placed in a map of the environment or in a corresponding location in a frame of reference of the glasses 100.

The method starts at operation 1302 with the initiation of a joint session involving all of the participants. The joint session may be initiated in response to an invitation transmitted by one of the participants from their client device 404 to their friends or connections, or may be in response to a prompt that is triggered upon the detection of the proximity between the client devices 404 or glasses 100 of users 402 who are friends or connections to each other and are either at or near enough to the location of the start course 1104 to be able to join in a reasonable time.

The method continues at operation 1304 with a determination of and comparison between the locations and poses of the devices (scooter 300, glasses 100 or client device 404) for the participants in the joint session. The purpose of this comparison is three-fold. Firstly, to locate each participant on the course, secondly, (in subsequent iterations of the method) to determine the relative positions of the participants on the leaderboard, and thirdly, to identify the relative positions of the scooters 300 and their riders to permit AR effects to be applied to scooters 300 or participants within the field of view of a particular participant. The location of any of the devices (glasses 100, scooter 300 or client device 404) can be used as a proxy for the location of its user for many purposes in the method, since they will essentially be collocated with the particular user 402 at all relevant times.

At operation 1306, the status information 912 and AR effects (such as virtual plume 916) are applied, updated and displayed by the glasses 100 for each participant. In some cases AR effects are applied based on the relative poses between scooters 300 as determined by measurements from position components 1708 (GPS receivers, inertial measurement units and so forth) and in some cases by object recognition performed by the glasses 100 or client device 404 to identify participants or scooters in the field of view of a particular pair of glasses 100.

The method continues at operation 1308 with a comparison between the location and field of view of the glasses 100 of each participant and the locations of any nearby virtual objects 414. The purpose of this comparison is two-fold. Firstly, to display any visible virtual objects 414 in the displays of the glasses 100, fixed to an appropriate frame of reference (e.g., a global real world frame of reference as shown in FIG. 7 or to a local frame of references such as the scooter 300 as shown in FIG. 6) and to determine any intersection of or proximity between a user 402 and a virtual object 414 fixed in the real world frame of reference, such as power down 514 or power up 512.

In operation 1324 any visible virtual objects 414 (such as power down 910, power up 512, a starting line 1106 and so forth) are rendered by the glasses 100 using conventional AR techniques. In some instances, nearby virtual objects in the line of sight of the glasses 100 may not be visible due to an intervening virtual object or physical object as determined by a 3D model of the environment, for example based on an existing 3D point cloud model of the area or 3D reconstruction techniques performed by the glasses 100 or client device 404 on the video feed from the cameras 132. From operation 1324 the method returns to operation 1304 and this loop continues repetitively to ensure that any movement by the user (as reflected by movement of one or more of the glasses 100, scooter 300 and client device 404) and the appearances of new or current virtual objects 414 in the field of view of the user 402 are correctly displayed to the user 402 by the glasses 100, that status information 912 is updated for each participant, and that any AR effects are correctly rendered.

The display of virtual objects in operation 1324 includes the display over the environment 802 of the boundaries 1204 of the course, an AR overlay 708 indicating the course or off-limits areas, a virtual starting line, virtual finish line 914 and any directional indicators such as arrows displayed on or over the pathway 904 to indicate turns and course direction. Individual scoring, position and timing information will also be displayed by the glasses 100 to each user 402, such as status information 912 as described with reference to operation 1306. In response to user input initiating the race, received from the organizer of the joint session, the status information 912 may provide a visual or audible countdown to race start to the participants via the glasses 100. Upon commencement of the race, the loop in the flowchart between operation 1324 and operation 1304 continues with appropriate updates as the race progresses.

From operation 1308, the method also proceeds to operation 1310 where it is determined whether the location of a user 402 (or a part of the user 402) is proximate to a virtual object 414 during the race. This can be as a result of the glasses 100, scooter 300 or client device 404 arriving at the location in the real world of the virtual object 414 or by visually detecting intersection of a hand or other body part of the user 402 with the virtual object 414. How close the user 402 and the virtual object 414 need to be to satisfy this test will depend on the particular virtual object and the associated implementation. For a power up 512 or a power down 514, the proximity will be sufficiently close as to make the user 402 and the virtual object 414 essentially collocated. For a virtual object that will trigger a warning or a change in performance characteristics such as a virtual traffic cone, or arrival on or departure from AR overlay 708, the proximity may be appropriately greater so as to provide sufficient warning before the scooter actually arrives at the hazard or departs from an authorized path. Sufficient proximity to satisfy the test for a particular virtual object can be considered to be intersection with the virtual object.

If no intersection is detected in operation 1310, the method returns to operation 1304 and continues from there. If intersection is detected in operation 1310, the virtual object 414 is updated if appropriate at operation 1312. For example, a power up 512 or power down 514 may disappear from its apparent location and thus be unavailable for re-use by the user 402 or other riders or it may be persistent and available for re-use as discussed above. The disappearance may be temporary or until the course is restarted. On the other hand, an object such as a virtual traffic cone or an AR overlay 708 is likely to be persistent.

The method then proceeds to operation 1314 where the parameters associated with the virtual object 414 are processed to determine the appropriate actions to be taken by the glasses 100 or client device 404 for the participant who has interacted with the virtual object 414. The actions taken in response to intersection with the virtual object 414 will depend on the particular characteristics of the virtual object 414. The parameters associated with the virtual object will define whether there are any sounds or visuals associated with intersection with the virtual object 414, the nature and extent of the associated change in the available or current performance characteristics of the scooter 300 (or other personal mobility system), the duration of the change in the performance characteristics (permanently, for a certain amount of time, for as long as the scooter 300 is sufficiently proximate to the location of the virtual object 414 and so forth), and the timing of the change (immediate, delayed, delayed until activated by the user 402, delayed until another condition is met, and so forth.) Additionally, if the virtual object 414 has an associated score value (increase or decrease), the user's score is adjusted accordingly and the status information 912 updated. In the case of a race, crossing the virtual finish line 914 will end the race (and the flowchart 1300) and the status information 912 will show a final time, score and race position as appropriate.

For virtual objects 414 that are associated with an immediate change in the performance, the method proceeds at operation 1316, where an instruction or signal is transmitted to the scooter 300 from the client device 404 or the glasses 100 to alter the performance characteristics of the scooter 300 according to the characteristics of the virtual object 414. The method then returns to operation 1304 and proceeds from there.

For virtual objects 414 that are associated with a delayed or selectable change in performance, the method proceeds at operation 1318, where the virtual object is transferred to a new location, typically in a local frame of reference of the glasses 100 or scooter 300 as described above with reference to FIG. 6 for example, where an input can be received from a user 402 to activate the performance altering characteristics corresponding to the virtual object 414 at a time of the user's choosing. The user has thus effectively acquired the virtual object 414.

Upon receipt of selection of the virtual object in operation 1320 (for example as discussed above with reference to FIG. 6), an instruction or signal is transmitted to the scooter 300 from the client device 404 or the glasses 100 in operation 1322 to alter the performance characteristics of the scooter 300 according to the characteristics of the virtual object 414. The method then returns to operation 1304 and proceeds from there.

Once commenced, the operations of flowchart 1300 will continue for each participant with the display of information and virtual objects 414 continuing as discussed above with reference to FIG. 5 to FIG. 9 continuing until the participant crosses the finish line 1108 as determined by one or more of their client device 404, glasses 100 or scooter 300 comparing its location to the location of the finish line.

As the participants cross the finish line, the status information 912 is updated for each participant, to show their finishing position, finishing time, score, and any related or derived information, such as an event or season leaderboard. Additional AR effects, such as streamers or fireworks could also be provided. Each participant is then able to share their results, screen shots, video recordings, and so forth, via a messaging application 1608 or social media application within which the method runs or is associated.

Figure 14:
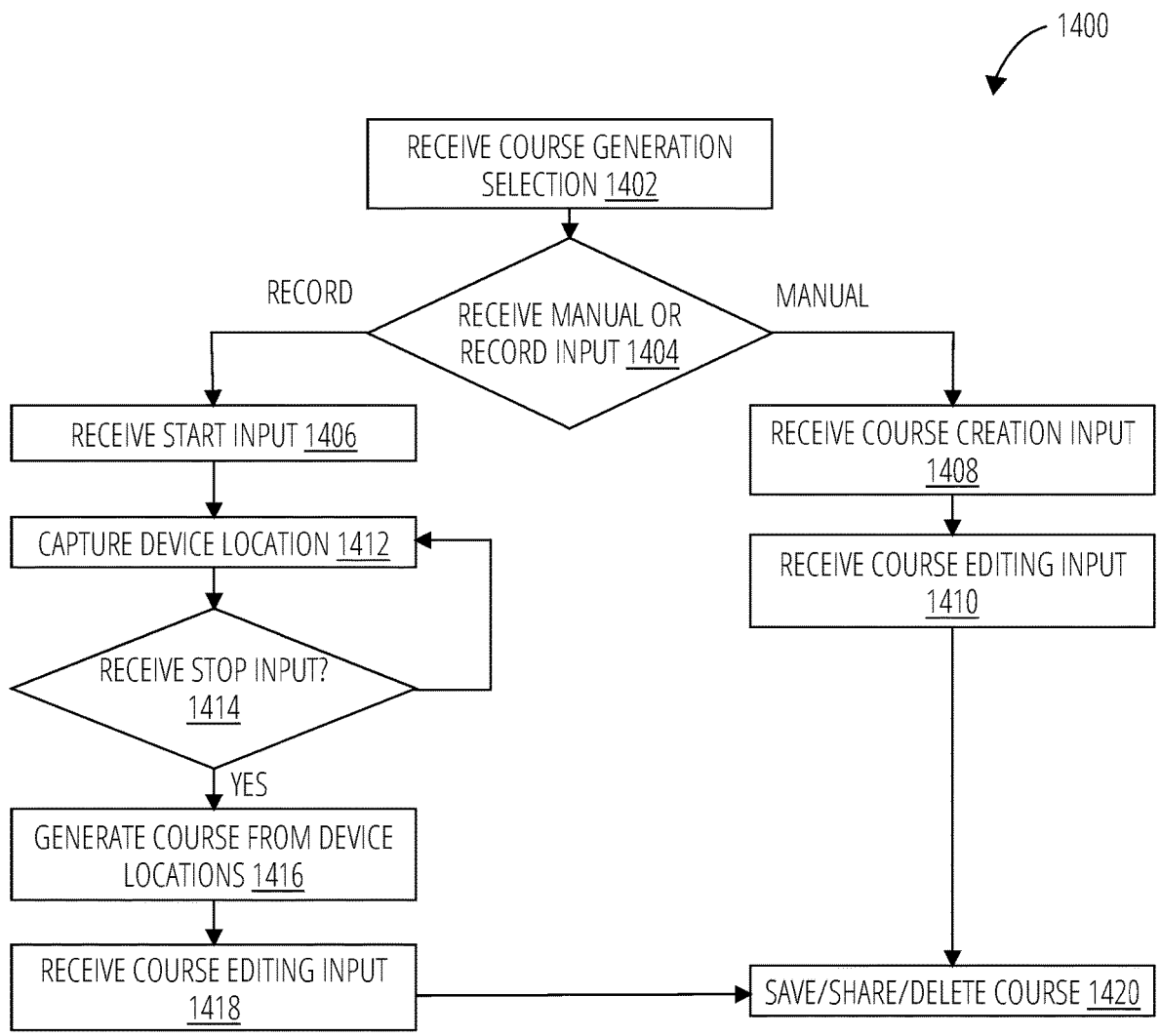
FIG. 14 is a flowchart showing course generation, according to one example.

FIG. 14 is a flowchart 1400 showing course generation, according to one example. The operations illustrated in FIG. 13 will typically execute on a combination of client device 404 and glasses 100, although the operations may execute exclusively in client device 404 or in a combination of the client device 404 and one or all of glasses 100, scooter 300 and server 410. For clarity, the flowchart is described in this example as executing on a client device 404.

The flowchart 1400 commences with receipt by the client device 404 of an input to generate a course at operation 1402. This may for example be the selection of a dedicated application on the client device, or the selection of the course generation feature from within a messaging or social media or other application. In response to this selection, various options for course generation will be displayed in a user interface on the client device, including options for manual or automatic course generation.

In response to receiving a manual course generation input at operation 1404, the client device 404 displays the user interfaces 1002 of FIG. 10 with a map 1004 that is initially based on the location of the client device 404, but which can be panned to a new location, or the location can be altered in response to search input provided by the user. At operation 1408, the client device 404 (via the relevant application) receives course creation input as discussed above with reference to FIG. 10 and FIG. 11 to create the course. Course editing input is then received in operation 1410 to edit, modify or add features as discussed above with reference to FIG. 11 and FIG. 12.

In response to receiving a "record course" input at operation 1404, the client device 404 displays a user interface with a "Start Recording" prompt. A user interface for course recording is likely to be displayed on the glasses 100 instead of or in addition to on the client device 404 for more convenient user input while riding the course.

At operation 1406, the glasses 100 or client device 404 (via the relevant application) receives user input to begin recording the course, for example by a tap input on a touchpad of the glasses 100 or by voice input. The glasses 100 or client device 404 then captures the initial location of the glasses 100, client device 404 or scooter 300 in operation 1412. Location information is provided by relevant hardware in the relevant device, including for example position components 1708 and motion components 1706 (see FIG. 17), such as a GPS receiver. The initial location is marked as the location of the start of the course. The user 402 then proceeds to ride the intended course and a "Stop Recording" prompt is displayed, again likely on the glasses 100 instead of or in addition to the client device 404.

If a "Stop Recording" input is not received at operation 1414, the glasses or client device continues to capture the location of the glasses 100, client device 404 or scooter 300 until a "Stop Recording" input is received. The location at which this input is received is then marked as the finish line of the course, and the course is generated by the client device in operation 1416 from the sequence of locations captured by the glasses 100 or client device 404 during recording. The user interface 1102 of FIG. 11 is then displayed and course editing input is then received in operation 1418 to edit, modify or add features as discussed above with reference to FIG. 11 and FIG. 12.

After the completion of any course editing in operation 1410 or operation 1418, the client device 404 receives input in operation 1420 to save, share or delete the course, and takes the corresponding action in response to received input.

Figure 15:
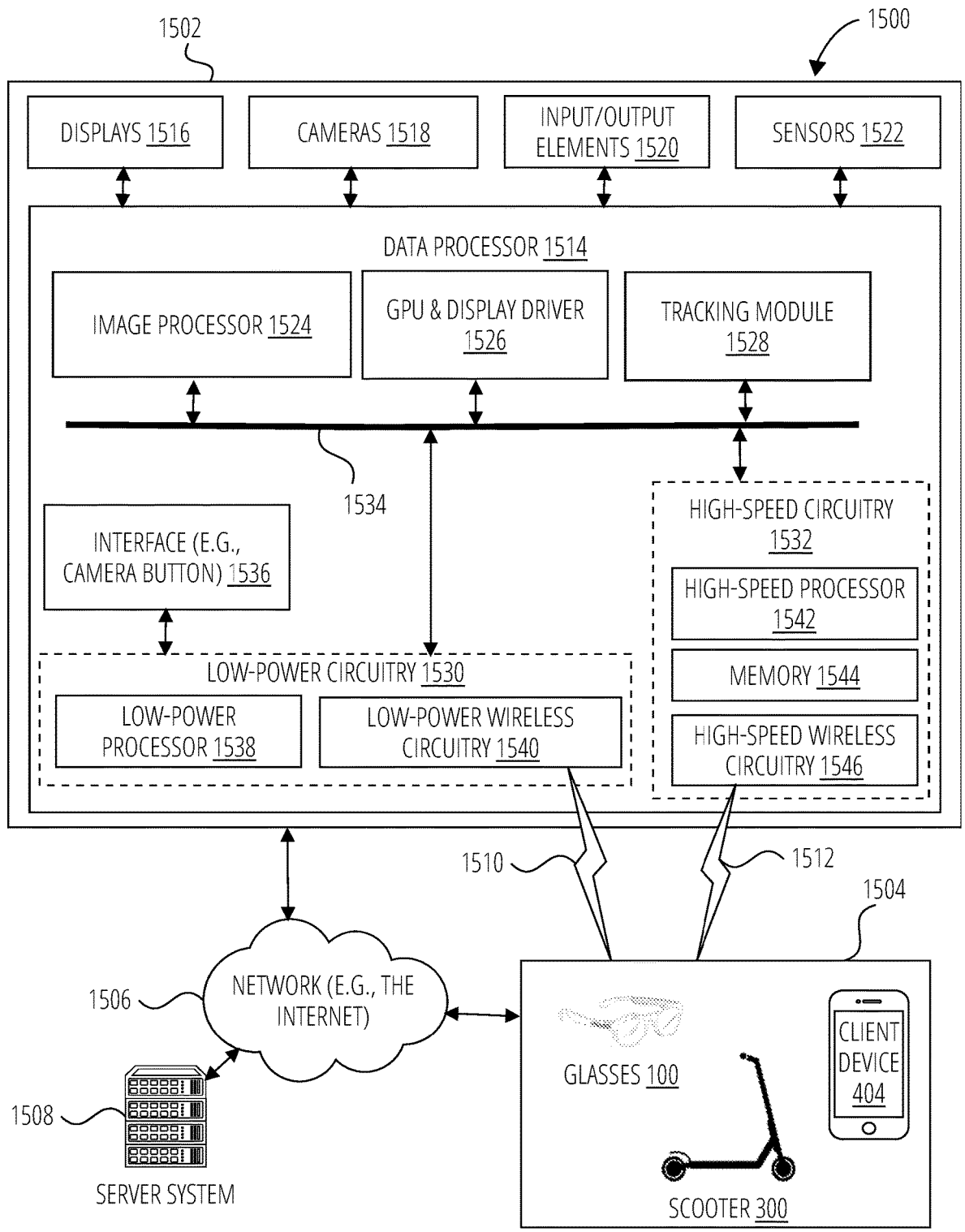
FIG. 15 is a block diagram illustrating a networked device 1502 including details of the glasses 100 and scooter 300, in accordance with some examples.

FIG. 15 is a block diagram 1500 illustrating a networked device 1502 including details of the glasses 100 and the scooter 300, in accordance with some examples.

The networked device 1502 (e.g., glasses 100, scooter 300, client device 404) is communicatively coupled to at least one second networked device 1504 and a server system 1508. The distinction between the networked device 1502 and the second networked device 1504 is made only for purpose of differentiating between two distinct devices. It should be understood that the description made herein with respect to the networked device 1502 describes in equal measure the second networked device 1504.

The networked device 1502 is capable of communicatively coupling with the second networked device 1504 using both a low-power wireless connection 1510 and a high-speed wireless connection 1512. The second networked device 1504 is connected to the server system 1508 via the network 1506. The network 1506 may include any combination of wired and wireless connections. The server system 1508 may be one or more computing devices as part of a service or network computing system. The second networked device 1504 and any elements of the server system 1508 and network 1506 may be implemented using details of the software architecture 1602 or the machine 1700 described in FIG. 16 and FIG. 17.

The networked device 1502 may include a data processor 1514, displays 1516, one or more cameras 1518, input/output elements 1520, and additional sensors 1522. The input/output elements 1520 may include microphones, audio speakers, biometric sensors, or additional display elements (e.g., Visual feedback element 332) integrated with the data processor 1514. In some implementations, input/output elements 1520 such as speakers, horns, haptic generators, displays and head lights/signal/telltale lights all are used to cue the user of a networked device 1502 of safety issues, warn the rider visually, aurally, or haptic notice of a safety issue. Examples of input/output elements 1520 are discussed further with respect to FIG. 16 and FIG. 17. For example, the input/output elements 1520 may include any of I/O components 1702 including output components 1704, motion components 1706, and so forth. Examples of the displays 1516 are discussed in FIG. 1 and FIG. 2. In the particular examples described herein, the displays 1516 include a display for each one of a user's left and right eyes.

Sensors 1522 may include optical sensors (e.g., photoresistors, lidar, infrared), radio frequency sensors (e.g., radar), mechanical wave sensors (e.g., sonar, pressure), and inertial sensors (e.g., accelerometers, gyroscopes, magnetometers). The networked device 1502 may use some or all of the foregoing in order to detect physical objects or determine a position or pose of the networked device 1502. For example, inertial sensors may provide information on the roll, yaw, and pitch of the networked device 1502. The networked device 1502 may use this information to detect and notify the user of accidents or other impacts, detect uphill travel to increase power to a propulsion source (e.g., propulsion source 322), or detect downhill travel to establish system braking or power recovery to keep the networked device 1502 (or the second networked device 1504) from exceeding safe speeds and accelerations. Integration with accelerometer/speedometer data also provides significant data for the networked device 1502 to detect, intervene if necessary, and transmit instructions to drive propulsion (e.g., by the management system 324 to the propulsion source 322) and braking performance.

The data processor 1514 includes an image processor 1524 (e.g., a video processor), a GPU & display driver 1526, a tracking module 1528, low-power circuitry 1530, and high-speed circuitry 1532. The components of the data processor 1514 are interconnected by a bus 1534.

The data processor 1514 also includes an interface 1536. The interface 1536 refers to any source of a user command that is provided to the data processor 1514. In one or more examples, the interface 1536 is a physical button that, when depressed, sends a user input signal from the interface 1536 to a low-power processor 1538. A depression of such button followed by an immediate release may be processed by the low-power processor 1538 as a request to capture a single image, or vice versa. A depression of such a button for a first period of time may be processed by the low-power processor 1538 as a request to capture video data while the button is depressed, and to cease video capture when the button is released, with the video captured while the button was depressed stored as a single video file. Alternatively, depression of a button for an extended period of time may capture a still image. In other examples, the interface 1536 may be any mechanical switch or physical interface capable of accepting user inputs associated with a request for data from the cameras 1518. In other examples, the interface 1536 may have a software component, or may be associated with a command received wirelessly from another source, such as from the client device 404.

The image processor 1524 includes circuitry to receive signals from the cameras 1518 and process those signals from the cameras 1518 into a format suitable for storage in the memory 1544 or for transmission to the client device 404. In one or more examples, the image processor 1524 (e.g., video processor) comprises a microprocessor integrated circuit (IC) customized for processing sensor data from the cameras 1518, along with volatile memory used by the microprocessor in operation.

The low-power circuitry 1530 includes the low-power processor 1538 and the low-power wireless circuitry 1540. These elements of the low-power circuitry 1530 may be implemented as separate elements or may be implemented on a single IC as part of a system on a single chip. The low-power processor 1538 includes logic for managing the other elements of the networked device 1502. As described above, for example, the low-power processor 1538 may accept user input signals from the interface 1536. The low-power processor 1538 may also be configured to receive input signals or instruction communications from the client device 404 via the low-power wireless connection 1510. The low-power wireless circuitry 1540 includes circuit elements for implementing a low-power wireless communication system. Bluetooth™ Smart, also known as Bluetooth™ low energy, is one standard implementation of a low power wireless communication system that may be used to implement the low-power wireless circuitry 1540. In other examples, other low power communication systems may be used.

The high-speed circuitry 1532 includes a high-speed processor 1542, a memory 1544, and a high-speed wireless circuitry 1546. The high-speed processor 1542 may be any processor capable of managing high-speed communications and operation of any general computing system needed for the data processor 1514. The high-speed processor 1542 includes processing resources needed for managing high-speed data transfers on the high-speed wireless connection 1512 using the high-speed wireless circuitry 1546. In certain examples, the high-speed processor 1542 executes an operating system such as a LINUX operating system or other such operating system such as the operating system 1604 of FIG. 16. In addition to any other responsibilities, the high-speed processor 1542 executing a software architecture for the data processor 1514 is used to manage data transfers with the high-speed wireless circuitry 1546. In certain examples, the high-speed wireless circuitry 1546 is configured to implement Institute of Electrical and Electronic Engineers (IEEE) 802.11 communication standards, also referred to herein as Wi-Fi. In other examples, other high-speed communications standards may be implemented by the high-speed wireless circuitry 1546.

The memory 1544 includes any storage device capable of storing camera data generated by the cameras 1518 and the image processor 1524. While the memory 1544 is shown as integrated with the high-speed circuitry 1532, in other examples, the memory 1544 may be an independent stand-alone element of the data processor 1514. In certain such examples, electrical routing lines may provide a connection through a chip that includes the high-speed processor 1542 from image processor 1524 or the low-power processor 1538 to the memory 1544. In other examples, the high-speed processor 1542 may manage addressing of the memory 1544 such that the low-power processor 1538 will boot the high-speed processor 1542 any time that a read or write operation involving the memory 1544 is needed.

The tracking module 1528 estimates a pose of the networked device 1502. For example, the tracking module 1528 uses image data and corresponding inertial data from the cameras 1518 and the position components 1708, as well as GPS data, to track a location and determine a pose of the networked device 1502 relative to a frame of reference (e.g., real-world environment). The tracking module 1528 continually gathers and uses updated sensor data describing movements of the networked device 1502 to determine updated three-dimensional poses of the networked device 1502 that indicate changes in the relative position and orientation relative to physical objects in the real-world environment.

In the glasses 100 implementation of the networked device 1502, the tracking module 1528 permits visual placement of virtual objects relative to physical objects by the networked device 1502 within the field of view of the user via the displays 1516. The GPU & display driver 1526 may use the pose of the networked device 1502 or the second networked device 1504 to generate frames of virtual content or other content to be presented on the displays 1516 when the networked device 1502 is functioning in a traditional augmented reality mode. In this mode, the GPU & display driver 1526 generates updated frames of virtual content based on updated three-dimensional poses of the networked device 1502 and/or the second networked device 1504, which reflect changes in the position and orientation of the user in relation to physical objects in the user's real-world environment.

One or more functions or operations described herein may also be performed in an application resident on the networked device 1502, on the second networked device 1504, or a server system 1508. For example, one or more functions or operations described herein may be performed by one of the applications 1606 such as messaging application 1608.

Figure 16:
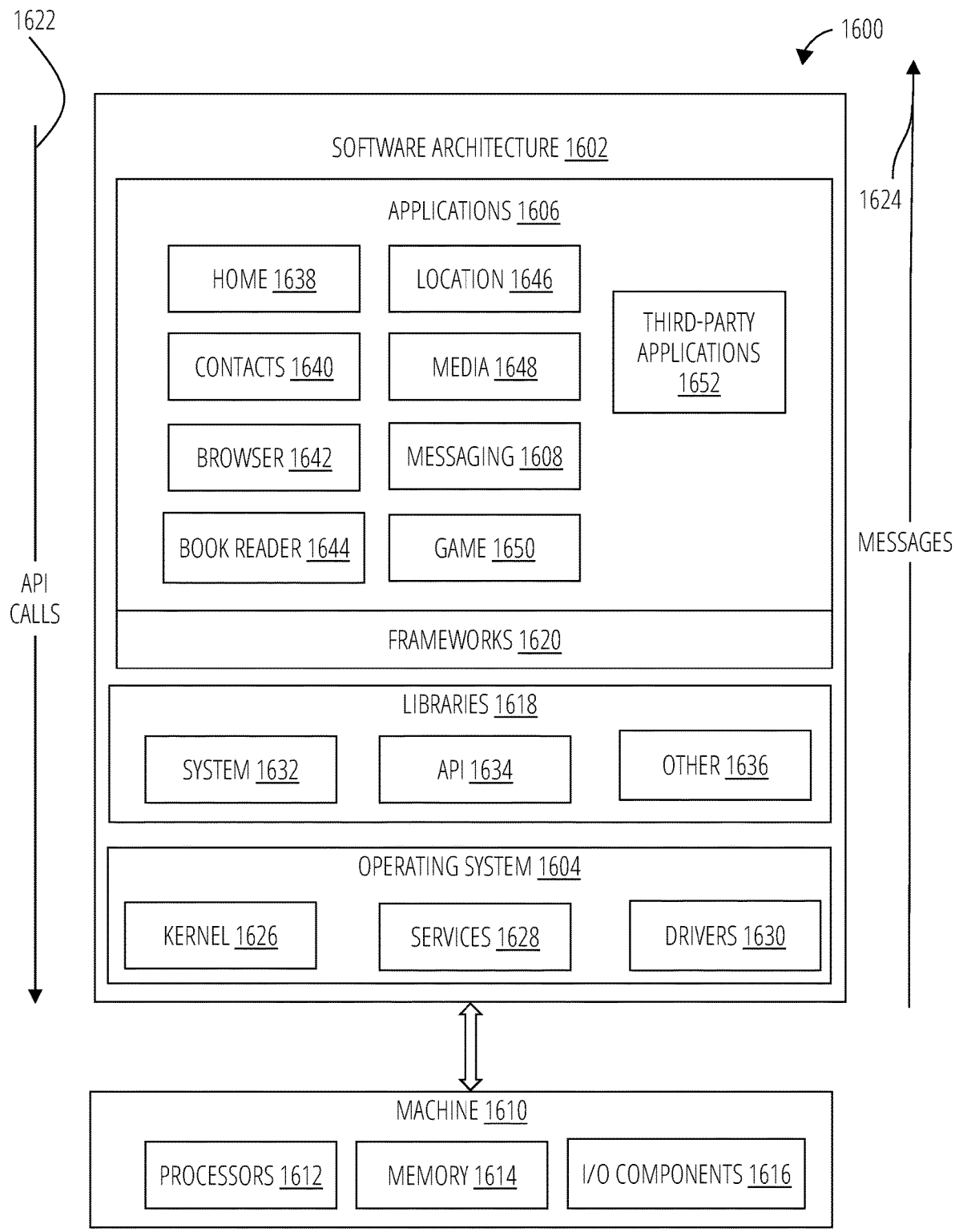
FIG. 16 is a block diagram showing a software architecture within which the present disclosure may be implemented, in accordance with some examples.

FIG. 16 is a block diagram 1600 illustrating a software architecture 1602, which can be installed on any one or more of the devices described herein. The software architecture 1602 is supported by hardware such as a machine 1610 that includes processors 1612, memory 1614, and I/O components 1616. In this example, the software architecture 1602 can be conceptualized as a stack of layers, where each layer provides a particular functionality. The software architecture 1602 includes layers such as an operating system 1604, libraries 1618, frameworks 1620, and applications 1606. Operationally, the applications 1606 invoke API calls 1622 through the software stack and receive messages 1624 in response to the API calls 1622.

The operating system 1604 manages hardware resources and provides common services. The operating system 1604 includes, for example, a kernel 1626, services 1628, and drivers 1630. The kernel 1626 acts as an abstraction layer between the hardware and the other software layers. For example, the kernel 1626 provides memory management, processor management (e.g., scheduling), component management, networking, and security settings, among other functionalities. The services 1628 can provide other common services for the other software layers. The drivers 1630 are responsible for controlling or interfacing with the underlying hardware. For instance, the drivers 1630 can include display drivers, camera drivers, BLUETOOTH® or BLUETOOTH® Low Energy drivers, flash memory drivers, serial communication drivers (e.g., Universal Serial Bus (USB) drivers), WI-FI® drivers, audio drivers, power management drivers, and so forth.

The libraries 1618 provide a low-level common infrastructure used by the applications 1606. The libraries 1618 can include system libraries 1632 (e.g., C standard library) that provide functions such as memory allocation functions, string manipulation functions, mathematic functions, and the like. In addition, the libraries 1618 can include API libraries 1634 such as media libraries (e.g., libraries to support presentation and manipulation of various media formats such as Moving Picture Experts Group-4 (MPEG4), Advanced Video Coding (H.264 or AVC), Moving Picture Experts Group Layer-3 (MP3), Advanced Audio Coding (AAC), Adaptive Multi-Rate (AMR) audio codec, Joint Photographic Experts Group (JPEG or JPG), or Portable Network Graphics (PNG)), graphics libraries (e.g., an OpenGL framework used to render in two dimensions (2D) and three dimensions (3D) in a graphic content on a display), database libraries (e.g., SQLite to provide various relational database functions), web libraries (e.g., WebKit to provide web browsing functionality), and the like. The libraries 1618 can also include a wide variety of other libraries 1636 to provide many other APIs to the applications 1606.

The frameworks 1620 provide a high-level common infrastructure that is used by the applications 1606. For example, the frameworks 1620 provide various graphical user interface (GUI) functions, high-level resource management, and high-level location services. The frameworks 1620 can provide a broad spectrum of other APIs that can be used by the applications 1606, some of which may be specific to a particular operating system or platform.

In an example, the applications 1606 may include a home application 1638, a contacts application 1640, a browser application 1642, a book reader application 1644, a location application 1646, a media application 1648, a messaging application 1608, a game application 1650, and a broad assortment of other applications such as third-party applications 1652. The applications 1606 are programs that execute functions defined in the programs. Various programming languages can be employed to create one or more of the applications 1606, structured in a variety of manners, such as object-oriented programming languages (e.g., Objective-C, Java, or C++) or procedural programming languages (e.g., C or assembly language). In a specific example, the third-party applications 1652 (e.g., applications developed using the ANDROID™ or IOS™ software development kit (SDK) by an entity other than the vendor of the particular platform) may be mobile software running on a mobile operating system such as IOS™, ANDROID™, WINDOWS® Phone, or another mobile operating system. In this example, the third-party applications 1652 can invoke the API calls 1622 provided by the operating system 1604 to facilitate functionality described herein.

Figure 17:
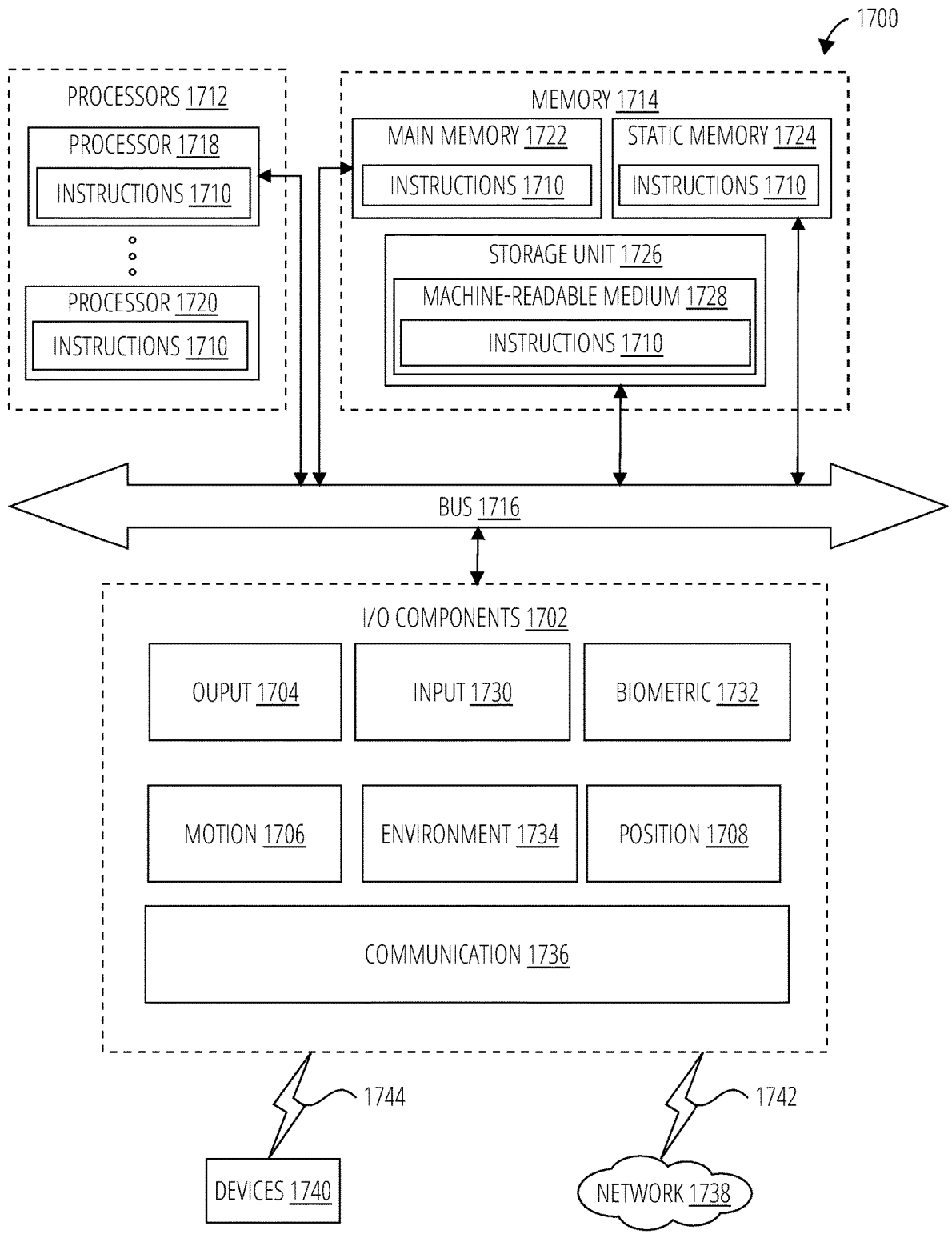
FIG. 17 is a diagrammatic representation of a machine, in the form of a computer system within which a set of instructions may be executed for causing the machine to perform any one or more of the methodologies discussed, in accordance with some examples.

FIG. 17 is a diagrammatic representation of a machine 1700 within which instructions 1710 (e.g., software, a program, an application, an applet, an app, or other executable code) for causing the machine 1700 to perform any one or more of the methodologies discussed herein may be executed. For example, the instructions 1710 may cause the machine 1700 to execute any one or more of the methods described herein. The instructions 1710 transform the general, non-programmed machine 1700 into a particular machine 1700 programmed to carry out the described and illustrated functions in the manner described. The machine 1700 may operate as a standalone device or may be coupled (e.g., networked) to other machines. In a networked deployment, the machine 1700 may operate in the capacity of a server machine or a client machine in a server-client network environment, or as a peer machine in a peer-to-peer (or distributed) network environment. The machine 1700 may comprise, but not be limited to, a server computer, a client computer, a personal computer (PC), a tablet computer, a laptop computer, a netbook, a set-top box (STB), a PDA, an entertainment media system, a cellular telephone, a smart phone, a mobile device, a AR wearable device (e.g., a smart watch), a smart home device (e.g., a smart appliance), other smart devices, a web appliance, a network router, a network switch, a network bridge, or any machine capable of executing the instructions 1710, sequentially or otherwise, that specify actions to be taken by the machine 1700. Further, while only a single machine 1700 is illustrated, the term "machine" shall also be taken to include a collection of machines that individually or jointly execute the instructions 1710 to perform any one or more of the methodologies discussed herein.

The machine 1700 may include processors 1712, memory 1714, and I/O components 1702, which may be configured to communicate with each other via a bus 1716. In an example, the processors 1712 (e.g., a Central Processing Unit (CPU), a Reduced Instruction Set Computing (RISC) processor, a Complex Instruction Set Computing (CISC) processor, a Graphics Processing Unit (GPU), a Digital Signal Processor (DSP), an ASIC, a Radio-Frequency Integrated Circuit (RFIC), another processor, or any suitable combination thereof) may include, for example, a processor 1718 and a processor 1720 that execute the instructions 1710. The term "processor" is intended to include multi-core processors that may comprise two or more independent processors (sometimes referred to as "cores") that may execute instructions contemporaneously. Although FIG. 17 shows multiple processors 1712, the machine 1700 may include a single processor with a single core, a single processor with multiple cores (e.g., a multi-core processor), multiple processors with a single core, multiple processors with multiples cores, or any combination thereof.

The memory 1714 includes a main memory 1722, a static memory 1724, and a storage unit 1726, both accessible to the processors 1712 via the bus 1716. The main memory 1714, the static memory 1724, and storage unit 1726 store the instructions 1710 embodying any one or more of the methodologies or functions described herein. The instructions 1710 may also reside, completely or partially, within the main memory 1722, within the static memory 1724, within machine-readable medium 1728 within the storage unit 1726, within at least one of the processors 1712 (e.g., within the processor's cache memory), or any suitable combination thereof, during execution thereof by the networked device 1502.

The I/O components 1702 may include a wide variety of components to receive input, provide output, produce output, transmit information, exchange information, capture measurements, and so on. The specific I/O components 1702 that are included in a particular machine will depend on the type of machine. For example, portable machines such as mobile phones may include a touch input device or other such input mechanisms, while a headless server machine will likely not include such a touch input device. It will be appreciated that the I/O components 1702 may include many other components that are not shown in FIG. 17. In various examples, the I/O components 1702 may include output components 1704 and input components 1730. The output components 1704 may include visual components (e.g., a display such as a plasma display panel (PDP), a light emitting diode (LED) display, a liquid crystal display (LCD), a projector, or a cathode ray tube (CRT)), acoustic components (e.g., speakers), haptic components (e.g., a vibratory motor, resistance mechanisms), other signal generators, and so forth. The input components 1730 may include alphanumeric input components (e.g., a keyboard, a touch screen configured to receive alphanumeric input, a photo-optical keyboard, or other alphanumeric input components), point-based input components (e.g., a mouse, a touchpad, a trackball, a joystick, a motion sensor, or another pointing instrument), tactile input components (e.g., a physical button, a touch screen that provides location and/or force of touches or touch gestures, or other tactile input components), audio input components (e.g., a microphone), and the like.

In further examples, the I/O components 1702 may include biometric components 1732, motion components 1706, environmental components 1734, or position components 1708, among a wide array of other components. For example, the biometric components 1732 include components to detect expressions (e.g., hand expressions, facial expressions, vocal expressions, body gestures, or eye tracking), measure bio-signals (e.g., blood pressure, heart rate, body temperature, perspiration, or brain waves), identify a person (e.g., voice identification, retinal identification, facial identification, fingerprint identification, or electroencephalogram-based identification), and the like. The motion components 1706 include acceleration sensor components (e.g., accelerometer), gravitation sensor components, rotation sensor components (e.g., gyroscope), and so forth. The environmental components 1734 include, for example, illumination sensor components (e.g., photometer), temperature sensor components (e.g., one or more thermometers that detect ambient temperature), humidity sensor components, pressure sensor components (e.g., barometer), acoustic sensor components (e.g., one or more microphones that detect background noise), proximity sensor components (e.g., infrared sensors that detect nearby objects), gas sensors (e.g., gas detection sensors to detection concentrations of hazardous gases for safety or to measure pollutants in the atmosphere), or other components that may provide indications, measurements, or signals corresponding to a surrounding physical environment. The position components 1708 include location sensor components (e.g., a GPS receiver component), altitude sensor components (e.g., altimeters or barometers that detect air pressure from which altitude may be derived), orientation sensor components (e.g., magnetometers), and the like.

Communication may be implemented using a wide variety of technologies. The I/O components 1702 further include communication components 1736 operable to couple the networked device 1502 to a network 1738 or devices 1740 via a coupling 1742 and a coupling 1744, respectively. For example, the communication components 1736 may include a network interface component or another suitable device to interface with the network 1738. In further examples, the communication components 1736 may include wired communication components, wireless communication components, cellular communication components, Near Field Communication (NFC) components, Bluetooth® components (e.g., Bluetooth® Low Energy), WiFi® components, and other communication components to provide communication via other modalities. The devices 1740 may be another machine or any of a wide variety of peripheral devices (e.g., a peripheral device coupled via a USB).

Moreover, the communication components 1736 may detect identifiers or include components operable to detect identifiers. For example, the communication components 1736 may include Radio Frequency Identification (RFID) tag reader components, NFC smart tag detection components, optical reader components (e.g., an optical sensor to detect one-dimensional bar codes such as Universal Product Code (UPC) bar code, multi-dimensional bar codes such as Quick Response (QR) code, Aztec code, Data Matrix, Dataglyph, MaxiCode, PDF417, Ultra Code, UCC RSS-2D bar code, and other optical codes), or acoustic detection components (e.g., microphones to identify tagged audio signals). In addition, a variety of information may be derived via the communication components 1736, such as location via Internet Protocol (IP) geolocation, location via Wi-Fi® signal triangulation, location via detecting an NFC beacon signal that may indicate a particular location, and so forth.

The various memories (e.g., memory 1714, main memory 1722, static memory 1724, and/or memory of the processors 1712) and/or storage unit 1726 may store one or more sets of instructions and data structures (e.g., software) embodying or used by any one or more of the methodologies or functions described herein. These instructions (e.g., the instructions 1710), when executed by processors 1712, cause various operations to implement the disclosed examples.

The instructions 1710 may be transmitted or received over the network 1738, using a transmission medium, via a network interface device (e.g., a network interface component included in the communication components 1736) and using any one of a number of well-known transfer protocols (e.g., hypertext transfer protocol (HTTP)). Similarly, the instructions 1710 may be transmitted or received using a transmission medium via the coupling 1744 (e.g., a peer-to-peer coupling) to the devices 1740.

A "carrier signal" refers to any intangible medium that is capable of storing, encoding, or carrying instructions for execution by the machine, and includes digital or analog communications signals or other intangible media to facilitate communication of such instructions. Instructions may be transmitted or received over a network using a transmission medium via a network interface device.

A "client device" refers to any machine that interfaces to a communications network to obtain resources from one or more server systems or other client devices. A client device may be, but is not limited to, a mobile phone, desktop computer, laptop, portable digital assistants (PDAs), smartphones, tablets, ultrabooks, netbooks, laptops, multi-processor systems, microprocessor-based or programmable consumer electronics, game consoles, set-top boxes, or any other communication device that a user may use to access a network.

A "communication network" refers to one or more portions of a network that may be an ad hoc network, an intranet, an extranet, a virtual private network (VPN), a local area network (LAN), a wireless LAN (WLAN), a wide area network (WAN), a wireless WAN (WWAN), a metropolitan area network (MAN), the Internet, a portion of the Internet, a portion of the Public Switched Telephone Network (PSTN), a plain old telephone service (POTS) network, a cellular telephone network, a wireless network, a Wi-Fi® network, another type of network, or a combination of two or more such networks. For example, a network or a portion of a network may include a wireless or cellular network and the coupling may be a Code Division Multiple Access (CDMA) connection, a Global System for Mobile communications (GSM) connection, or other types of cellular or wireless coupling. In this example, the coupling may implement any of a variety of types of data transfer technology, such as Single Carrier Radio Transmission Technology (1×RTT), Evolution-Data Optimized (EVDO) technology, General Packet Radio Service (GPRS) technology, Enhanced Data rates for GSM Evolution (EDGE) technology, third Generation Partnership Project (3GPP) including 3G, fourth generation wireless (4G) networks, Universal Mobile Telecommunications System (UMTS), High Speed Packet Access (HSPA), Worldwide Interoperability for Microwave Access (WiMAX), Long Term Evolution (LTE) standard, others defined by various standard-setting organizations, other long-range protocols, or other data transfer technology.

A "component" refers to a device, physical entity, or logic having boundaries defined by function or subroutine calls, branch points, APIs, or other technologies that provide for the partitioning or modularization of particular processing or control functions. Components may be combined via their interfaces with other components to carry out a machine process. A component may be a packaged functional hardware unit designed for use with other components and a part of a program that usually performs a particular function of related functions. Components may constitute either software components (e.g., code embodied on a machine-readable medium) or hardware components. A "hardware component" is a tangible unit capable of performing certain operations and may be configured or arranged in a certain physical manner. In various examples, one or more computer systems (e.g., a standalone computer system, a client computer system, or a server computer system) or one or more hardware components of a computer system (e.g., a processor or a group of processors) may be configured by software (e.g., an application or application portion) as a hardware component that operates to perform certain operations as described herein. A hardware component may also be implemented mechanically, electronically, or any suitable combination thereof. For example, a hardware component may include dedicated circuitry or logic that is permanently configured to perform certain operations. A hardware component may be a special-purpose processor, such as a field-programmable gate array (FPGA) or an application specific integrated circuit (ASIC). A hardware component may also include programmable logic or circuitry that is temporarily configured by software to perform certain operations. For example, a hardware component may include software executed by a general-purpose processor or other programmable processor. Once configured by such software, hardware components become specific machines (or specific components of a machine) uniquely tailored to perform the configured functions and are no longer general-purpose processors. It will be appreciated that the decision to implement a hardware component mechanically, in dedicated and permanently configured circuitry, or in temporarily configured circuitry (e.g., configured by software), may be driven by cost and time considerations. Accordingly, the phrase "hardware component" (or "hardware-implemented component") should be understood to encompass a tangible entity, be that an entity that is physically constructed, permanently configured (e.g., hardwired), or temporarily configured (e.g., programmed) to operate in a certain manner or to perform certain operations described herein. Considering examples in which hardware components are temporarily configured (e.g., programmed), each of the hardware components need not be configured or instantiated at any one instance in time. For example, where a hardware component comprises a general-purpose processor configured by software to become a special-purpose processor, the general-purpose processor may be configured as respectively different special-purpose processors (e.g., comprising different hardware components) at different times. Software accordingly configures a particular processor or processors, for example, to constitute a particular hardware component at one instance of time and to constitute a different hardware component at a different instance of time. Hardware components can provide information to, and receive information from, other hardware components. Accordingly, the described hardware components may be regarded as being communicatively coupled. Where multiple hardware components exist contemporaneously, communications may be achieved through signal transmission (e.g., over appropriate circuits and buses) between or among two or more of the hardware components. In examples in which multiple hardware components are configured or instantiated at different times, communications between such hardware components may be achieved, for example, through the storage and retrieval of information in memory structures to which the multiple hardware components have access. For example, one hardware component may perform an operation and store the output of that operation in a memory device to which it is communicatively coupled. A further hardware component may then, at a later time, access the memory device to retrieve and process the stored output. Hardware components may also initiate communications with input or output devices, and can operate on a resource (e.g., a collection of information). The various operations of example methods described herein may be performed, at least partially, by one or more processors that are temporarily configured (e.g., by software) or permanently configured to perform the relevant operations. Whether temporarily or permanently configured, such processors may constitute processor-implemented components that operate to perform one or more operations or functions described herein. As used herein, "processor-implemented component" refers to a hardware component implemented using one or more processors. Similarly, the methods described herein may be at least partially processor-implemented, with a particular processor or processors being an example of hardware. For example, at least some of the operations of a method may be performed by one or more processors or processor-implemented components. Moreover, the one or more processors may also operate to support performance of the relevant operations in a "cloud computing" environment or as a "software as a service" (SaaS). For example, at least some of the operations may be performed by a group of computers (as examples of machines including processors), with these operations being accessible via a network (e.g., the Internet) and via one or more appropriate interfaces (e.g., an API). The performance of certain of the operations may be distributed among the processors, not only residing within a single machine, but deployed across a number of machines. In some examples, the processors or processor-implemented components may be located in a single geographic location (e.g., within a home environment, an office environment, or a server farm). In other examples, the processors or processor-implemented components may be distributed across a number of geographic locations.

A "computer-readable medium" refers to both machine-storage media and transmission media. Thus, the terms include both storage devices/media and carrier waves/modulated data signals. The terms "machine-readable medium," "computer-readable medium" and "device-readable medium" mean the same thing and may be used interchangeably in this disclosure.

An "ephemeral message" refers to a message that is accessible for a time-limited duration. An ephemeral message may be a text, an image, a video, and the like. The access time for the ephemeral message may be set by the message sender. Alternatively, the access time may be a default setting, or a setting specified by the recipient. Regardless of the setting technique, the message is transitory.

A "machine-storage medium" refers to a single or multiple storage devices and/or media (e.g., a centralized or distributed database, and/or associated caches and servers) that store executable instructions, routines and/or data. The term shall accordingly be taken to include, but not be limited to, solid-state memories, and optical and magnetic media, including memory internal or external to processors. Specific examples of machine-storage media, computer-storage media and/or device-storage media include non-volatile memory, including by way of example semiconductor memory devices, e.g., erasable programmable read-only memory (EPROM), electrically erasable programmable read-only memory (EEPROM), FPGA, and flash memory devices; magnetic disks such as internal hard disks and removable disks; magneto-optical disks; and CD-ROM and DVD-ROM disks The terms "machine-storage medium," "device-storage medium," "computer-storage medium" mean the same thing and may be used interchangeably in this disclosure. The terms "machine-storage media," "computer-storage media," and "device-storage media" specifically exclude carrier waves, modulated data signals, and other such media, at least some of which are covered under the term "signal medium."

A "processor" refers to any circuit or virtual circuit (a physical circuit emulated by logic executing on an actual processor) that manipulates data values according to control signals (e.g., "commands", "op codes", "machine code", and so forth) and which produces corresponding output signals that are applied to operate a machine. A processor may, for example, be a Central Processing Unit (CPU), a Reduced Instruction Set Computing (RISC) processor, a Complex Instruction Set Computing (CISC) processor, a Graphics Processing Unit (GPU), a Digital Signal Processor (DSP), an Application Specific Integrated Circuit (ASIC), a Radio-Frequency Integrated Circuit (RFIC) or any combination thereof. A processor may further be a multi-core processor having two or more independent processors (sometimes referred to as "cores") that may execute instructions contemporaneously.

A "signal medium" refers to any intangible medium that is capable of storing, encoding, or carrying the instructions for execution by a machine and includes digital or analog communications signals or other intangible media to facilitate communication of software or data. The term "signal medium" shall be taken to include any form of a modulated data signal, carrier wave, and so forth. The term "modulated data signal" means a signal that has one or more of its characteristics set or changed in such a matter as to encode information in the signal. The terms "transmission medium" and "signal medium" mean the same thing and may be used interchangeably in this disclosure.

Changes and modifications may be made to the disclosed examples without departing from the scope of the present disclosure. These and other changes or modifications are intended to be included within the scope of the present disclosure, as expressed in the following claims.

What is claimed is:

1. A method, performed by one or more processors, of generating a virtual course in a real world environment, along which a user of a personal mobility device can ride, the method comprising:
    receiving user input to begin generating a course;
    capturing sequential location data from location components associated with the user or the personal mobility device while the user is riding the personal mobility device;
    determining at least one edge of the virtual course either by comparing the captured sequential location data to known map data or by performing image processing on images captured by a head-worn device worn by the user while riding the personal mobility device;
    displaying a menu comprising a plurality of available interactive virtual objects;
    receiving user input to place one or more interactive virtual objects on the course while the user is riding the personal mobility device, by dragging and dropping one or more available interactive virtual objects from the menu onto the course;
    receiving user input to stop generating the course;
    generating the course using the captured sequential location data, the user input to place one or more interactive objects on the course, and the determined at least one edge to define a course track and a course boundary including the one or more interactive virtual objects; and
    saving or forwarding the generated course based on further user input.

2. The method of claim 1, further comprising:
    defining an augmented-reality overlay corresponding to the course track or an area outside of the course track, the augmented-reality overlay in use being displayed by the head-worn device over the real world environment to indicate the course track.

3. The method of claim 2, further comprising:
    defining an action based on detecting departure of a subsequent personal mobility device from the course in use, wherein the action comprises pulsing the augmented-reality overlay based on detecting departure of the subsequent personal mobility device from the course in use.

4. The method of claim 1, further comprising:
    defining an action based on detecting departure of a subsequent personal mobility device from the course in use.

5. The method of claim 4, wherein the action comprises reducing functioning of the subsequent personal mobility device based on detecting departure of the subsequent personal mobility device from the course in use.

6. The method of claim 1,
    wherein the one or more interactive virtual objects have parameters associated therewith to modify an operational characteristic of a subsequent personal mobility device in use when a location of the subsequent personal mobility device corresponds with the specific location on the course of a particular interactive virtual object.

7. The method of claim 6, further comprising:
    defining an augmented-reality overlay corresponding to the course track or an area outside of the course track, the augmented-reality overlay in use being displayed by the head-worn device over the real world environment to indicate the course track.

8. The method of claim 6, further comprising:
    defining an action based on detecting departure of a subsequent personal mobility device from the course in use.

9. A computing apparatus for generating a virtual course in a real world environment, along which a user of a personal mobility device can ride, the computing apparatus comprising:
    at least one processor; and
    a memory storing instructions that, when executed by the at least one processor, configure the apparatus to perform operations comprising:
    receiving user input to begin generating a course;
    capturing sequential location data from location components associated with the user or the personal mobility device while the user is riding the personal mobility device;
    determining at least one edge of the virtual course either by comparing the captured sequential location data to known map data or by performing image processing on images captured by a head-worn device worn by the user while riding the personal mobility device;
    displaying a menu comprising a plurality of available interactive virtual objects;
    receiving user input to place one or more interactive virtual objects on the course while the user is riding the personal mobility device, by dragging and dropping one or more available interactive virtual objects from the menu onto the course;
    receiving user input to stop generating the course;
    generating the course using the captured sequential location data, the user input to place one or more interactive objects on the course, and the determined at least one edge to define a course track and a course boundary including the one or more interactive virtual objects; and
    saving or forwarding the generated course based on further user input.

10. The computing apparatus of claim 9, wherein the operations further comprise:
    defining an augmented-reality overlay corresponding to the course track or an area outside of the course track, the augmented-reality overlay in use being displayed by the head-worn device over the real world environment to indicate the course track.

11. The computing apparatus of claim 10, wherein the operations further comprise:

defining an action based on detecting departure of a subsequent personal mobility device from the course in use, wherein the action comprises pulsing the augmented-reality overlay based on detecting departure of the subsequent personal mobility device from the course in use.

12. The computing apparatus of claim 9, wherein the operations further comprise:

defining an action based on detecting departure of a subsequent personal mobility device from the course in use, wherein the action comprises reducing functioning of the subsequent personal mobility device based on detecting departure of the subsequent personal mobility device from the course in use.

13. The computing apparatus of claim 9, wherein the one or more interactive virtual objects have parameters associated therewith to modify an operational characteristic of a subsequent personal mobility device in use when a location of the subsequent personal mobility device corresponds with the specific location on the course of a particular interactive virtual object.

14. The computing apparatus of claim 13, wherein the operations further comprise:

defining an augmented-reality overlay corresponding to the course track or an area outside of the course track, the augmented-reality overlay in use being displayed by the head-worn device over the real world environment to indicate the course track.

15. A non-transitory computer-readable storage medium, the computer-readable storage medium including instructions that when executed by a computer, cause the computer to perform operations for generating a virtual course in a real world environment, along which a user of a personal mobility device can ride, the operations comprising:

receiving user input to begin generating a course;

capturing sequential location data from location components associated with the user or the personal mobility device while the user is riding the personal mobility device;

determining at least one edge of the virtual course either by comparing the captured sequential location data to known map data or by performing image processing on images captured by a head-worn device worn by the user while riding the personal mobility device;

displaying a menu comprising a plurality of available interactive virtual objects;

receiving user input to place one or more interactive virtual objects on the course while the user is riding the personal mobility device, by dragging and dropping one or more available interactive virtual objects from the menu onto the course;

receiving user input to stop generating the course;

generating the course using the captured sequential location data, the user input to place one or more interactive objects on the course, and the determined at least one edge to define a course track and a course boundary including the one or more interactive virtual objects; and saving or forwarding the generated course based on further user input.

16. The computer-readable storage medium of claim 15, wherein the operations further comprise:

defining an augmented-reality overlay corresponding to the course track or an area outside of the course track, the augmented-reality overlay in use being displayed by the head-worn device over the real world environment to indicate the course track.

17. The computer-readable storage medium of claim 16, wherein the operations further comprise:

defining an action based on detecting departure of a subsequent personal mobility device from the course in use, wherein the action comprises pulsing the augmented-reality overlay based on detecting departure of the subsequent personal mobility device from the course in use.

18. The computer-readable storage medium of claim 15, wherein the operations further comprise:

defining an action based on detecting departure of a subsequent personal mobility device from the course in use, wherein the action comprises reducing functioning of the subsequent personal mobility device based on detecting departure of the subsequent personal mobility device from the course in use.

19. The computer-readable storage medium of claim 15, wherein the one or more interactive virtual objects have parameters associated therewith to modify an operational characteristic of a subsequent personal mobility device in use when a location of the subsequent personal mobility device corresponds with the specific location on the course of a particular interactive virtual object.

20. The computer-readable storage medium of claim 19, wherein the operations further comprise:

defining an augmented-reality overlay corresponding to the course track or an area outside of the course track, the augmented-reality overlay in use being displayed by the head-worn device over the real world environment to indicate the course track.

\* \* \* \* \*